(12) United States Patent
Kamiya et al.

(10) Patent No.: US 9,364,979 B2
(45) Date of Patent: Jun. 14, 2016

(54) MOLDED STRUCTURE BODY AND METHOD OF PRODUCING THE SAME

(71) Applicant: TOYOTA BOSHOKU KABUSHIKI KAISHA, Aichi-ken (JP)

(72) Inventors: Hideo Kamiya, Hekinan (JP); Hideki Nakamura, Toyota (JP); Yuuta Yamanobe, Toyota (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 834 days.

(21) Appl. No.: 13/647,780

(22) Filed: Oct. 9, 2012

(65) Prior Publication Data
US 2013/0108835 A1  May 2, 2013

(30) Foreign Application Priority Data

Oct. 27, 2011 (JP) .................. 2011-235818
Oct. 27, 2011 (JP) .................. 2011-235819

(51) Int. Cl.
*B32B 3/00* (2006.01)
*B32B 5/14* (2006.01)
*B29C 45/14* (2006.01)
(Continued)

(52) U.S. Cl.
CPC ....... *B29C 45/1418* (2013.01); *B29C 45/14262* (2013.01); *B29C 45/14311* (2013.01); *B29C 45/14786* (2013.01); *B29C 69/02* (2013.01); *B29C 2045/14188* (2013.01); *B29C 2045/14286* (2013.01); *B29L 2031/3014* (2013.01);
(Continued)

(58) Field of Classification Search
CPC ............... B29C 45/14; B29C 45/1418; B29C 45/14311; B29C 45/14336; B29C 45/14786; B29C 45/14262; B29C 69/02; B29C 2045/14188; B29C 2045/14286; Y10T 428/31797; Y10T 428/31909; Y10T 428/24595; B29L 2031/3014; B60R 13/02; B60R 13/0243; B60R 13/0206; B32B 5/14
USPC .................................... 428/156, 170
See application file for complete search history.

(56) References Cited

U.S. PATENT DOCUMENTS 3,770,033 A   11/1973  Gavillet et al.
5,902,533 A    5/1999  Munger et al.
(Continued)

FOREIGN PATENT DOCUMENTS

CN         1389337         1/2003
(Continued)

OTHER PUBLICATIONS

China Office action, dated Sep. 3, 2014 along with an English translation thereof.
(Continued)

*Primary Examiner* — Catherine A Simone
(74) *Attorney, Agent, or Firm* — Greenblum & Bernstein, P.L.C.

(57) ABSTRACT

A molded structure body includes a base member including at least thermoplastic resin and a molded member. The base member includes a connection portion, a first surrounding portion provided close to the connection portion and having a first density, and a second surrounding portion provided close to the first surrounding portion and having a second density. The first density is higher than the second density. The molded member is connected to and molded with the base member by injection of melted resin to the base member, and the molded member is connected to the connection portion.

14 Claims, 15 Drawing Sheets

(51) Int. Cl.
*B29C 69/02* (2006.01)
*B29L 31/30* (2006.01)

(52) U.S. Cl.
CPC .. *Y10T428/24595* (2015.01); *Y10T 428/31797* (2015.04); *Y10T 428/31909* (2015.04)

(56) References Cited

U.S. PATENT DOCUMENTS

| | | | |
|---|---|---|---|
| 6,756,003 | B2 | 6/2004 | Kieltyka et al. |
| 7,186,105 | B2 | 3/2007 | Cesano |
| 8,535,584 | B2 | 9/2013 | Tsuda et al. |

FOREIGN PATENT DOCUMENTS

| | | |
|---|---|---|
| CN | 101500776 | 8/2009 |
| JP | 08-118402 | 5/1996 |
| JP | 2000-263616 | 9/2000 |
| JP | 2004-231030 | 8/2004 |
| JP | 2006-326877 | 12/2006 |
| JP | 2006-347128 | 12/2006 |
| JP | 2009-113244 | 5/2009 |
| JP | 2010-274636 | 12/2010 |
| WO | WO82/03359 | 10/1982 |

OTHER PUBLICATIONS

China Office action, dated Mar. 30, 2015 along with an English translation thereof.
Japan (JP Appl. No. 2011-235819) Office action, dated Feb. 17, 2015 along with an English translation thereof.
Japan (JP Appl. No. 2011-235818) Office action, dated Feb. 17, 2015 along with an English translation thereof.
Germany Office action, dated Jun. 5, 2014 along with an English translation thereof.

MOLDED STRUCTURE BODY AND METHOD OF PRODUCING THE SAME

CROSS REFERENCE TO RELATED APPLICATION

This application claims priority from Japanese Patent Application Nos. 2011-235818 filed on Oct. 27, 2011 and 2011-235819 filed on Oct. 27, 2011. The entire contents of the priority applications are incorporated herein by reference.

FIELD OF THE INVENTION

The present disclosure relates to a molded structure body and a method of producing the same.

BACKGROUND OF THE INVENTION

A molded structure body used for a door trim includes a base member containing a thermoplastic resin and a molded member such as a bracket. The molded member is connected to the base member and a thermoplastic resin is injection molded with the base member. Accordingly, the molded member is molded with the base member. In this technology, a connection portion of the base member that is connected to the molded member has a reduced density and this allows melted resin of the molded member to penetrate the connection portion easily. This increases bonding strength due to the anchoring effect caused in the molded member and the connection portion.

In the related art, as illustrated in FIG. 5, a base member 3 is pressed in a molding tool 1 and melted resin is injected into a cavity C1 that is formed in the molding tool 1 as a molding space. Accordingly, the molded member is molded. In a condition that the base member 3 is pressed in the molding tool 1, a surrounding portion around a connection portion 4 of the base member 3 that is connected to the melted resin is in contact with a mold surface 1A of the molding tool 1.

However, in the above structure, when the melted resin is injected into the cavity C1, the melted resin may reach or leak to the surrounding portion 5 around the connection portion 4 of the base member 3 as illustrated in FIG. 5. The melted resin may penetrate a quite small gap between the base member 3 and the mold surface 1A in the surrounding portion 5 or the low density of the connection portion 4 of the base member 3 allows the melted resin to easily penetrate the surrounding portion 5 around the connection portion 4. Accordingly, the melted resin may penetrate inside of the base member 3 along a surface thereof and emerge from a surface of the surrounding portion 5.

If the melted resin used for molding the molded member 6 reaches the surrounding portion 5 around the connection portion 4 in the base member 3, a connection area between the base member 3 and the molded member 6 may increase. Therefore, if the injected melted resin of a molded object is cooled down and contracts, a recess or a projection may be formed on a surface 3A of the base member 3 that is opposite to the surface having the connection portion 4. As illustrated in FIG. 6, a projection 3B is formed, and this deteriorates design.

SUMMARY OF THE INVENTION

The present invention has been made in view of the aforementioned circumstances. An objective of the present invention is to provide a molded structure body in which melted resin is less likely to reach a surrounding portion around a connection portion between a base member and a molded member in molding the molded member, design is less likely to be deteriorated, and strength of the surroundings of the connection portion increases. Another objective of the present invention is to provide a method of producing such a molded structure body.

A technology described herein relates to a molded structure body including a base member including at least thermoplastic resin and a molded member. The base member includes a connection portion, a first surrounding portion provided close to the connection portion and having a first density, and a second surrounding portion provided close to the first surrounding portion and having a second density. The first density is higher than the second density. The molded member is connected to and molded with the base member by injection of melted resin to the base member, and the molded member is connected to the connection portion.

DETAILED DESCRIPTION OF THE PREFERRED EMBODIMENTS

Figure 1:
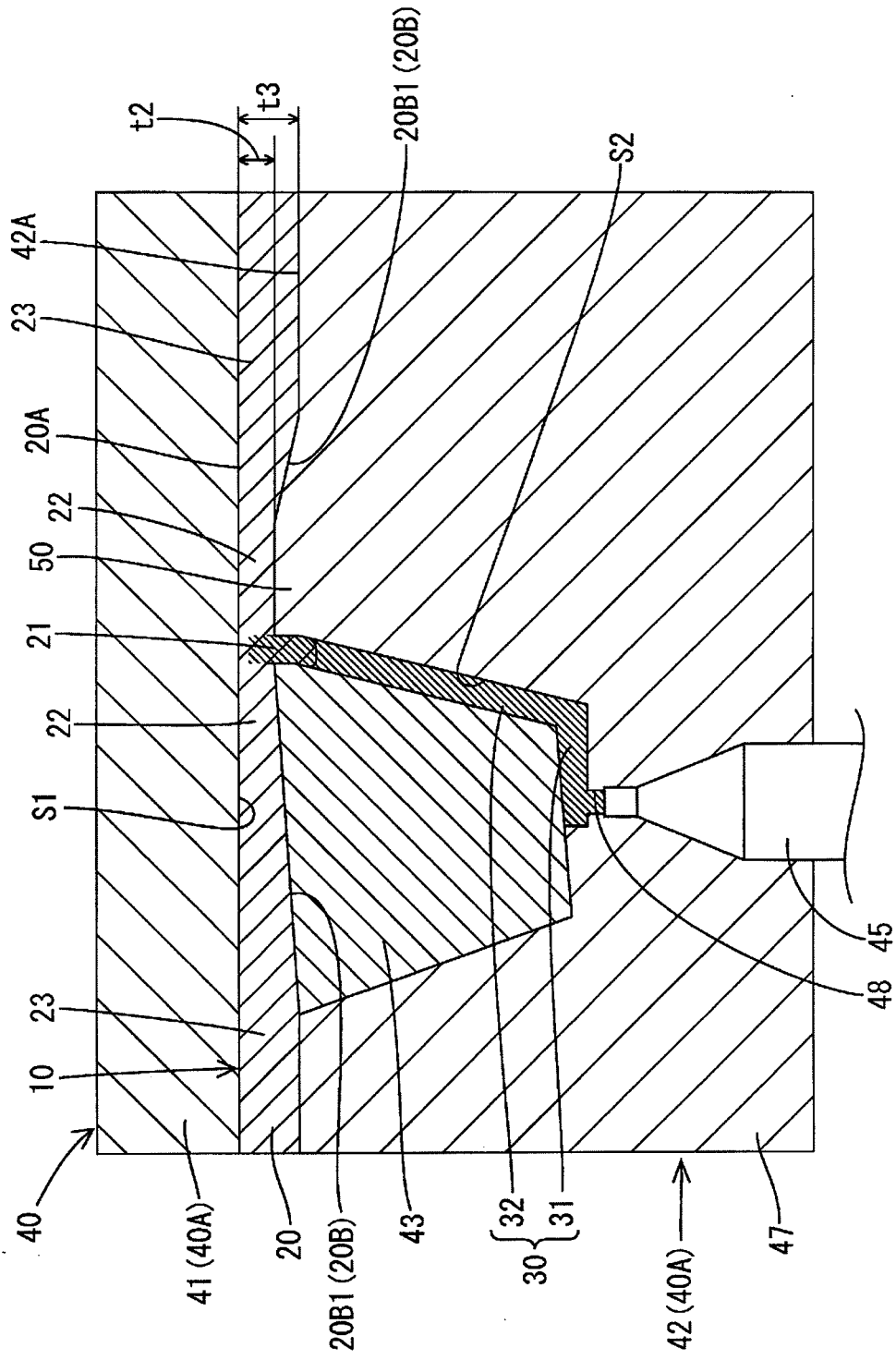
FIG. 1 is a cross-sectional view illustrating a molded structure body in a producing process according to a first embodiment.

A first embodiment will be explained with reference to FIGS. 1 to 3. A door trim 10 (a molded structure body) is mounted to a vehicular door. As illustrated in FIG. 1, the door trim 10 includes a trim board 20 (a base member) and a bracket 30 (a molded member) such as a clip seat that is bonded to the trim board 20.

The trim board 20 is formed in a flat plate and configured with fibers and polypropylene that is impregnated in the fibers. Polypropylene is one of thermoplastic resins. A board P1 formed in a mat is compressed with press molding to decrease a thickness thereof, as illustrated in FIG. 2. Accordingly, the trim board 20 is formed to have a density higher than the board P1. The fibers used for the trim board 20 include wood fibers obtained by fiberizing woods or bast fibers such as kenaf. However, the fibers are not limited thereto.

Polypropylene contained in the trim board 20 functions as a binder that connects the fibers. The trim board 20 may be formed of only polypropylene or only other thermoplastic resin or may be formed of a mixture of fibers and a thermoplastic resin other than polypropylene such as polyethylene terephthalate.

The bracket 30 is formed of polypropylene that is a thermoplastic resin. As illustrated in FIG. 1, the bracket 30 is formed to be projected from a rear surface of the trim board 20 that is a surface close to an inner side of a vehicular compartment. The bracket 30 includes a distal end wall 31 and a basal end wall 32. The distal end wall 31 is bent to be substantially perpendicular to the basal end wall 32. The distal end wall 31 has a mounting hole to which a clip is mounted. The trim board 20 is mounted to a door inner panel via the clip and the bracket 30.

A connection portion 21 of the trim board 20 that is connected to the bracket 30 is a low density portion that has density lower than a surrounding portion (a first surrounding portion 22) around the connection portion 21. In the present embodiment, the density represents a weight of thermoplastic resin and fibers per a unit volume. When the board P1 is compressed with press molding by a molding device 40, the connection portion 21 is not compressed by an upper mold 41 and a lower mold 42 or is compressed with a small force. Accordingly, the connection portion 21 has a lower density.

The low density portion extends from a front surface to a rear surface of the trim board 20. Namely, the low density portion is formed over substantially an entire thickness of the trim board 20. The trim board 20 has a thickness t2 in the first surrounding portion 22 that is located around the connection portion 21 and has a thickness t3 in a second surrounding portion 23 that is located around the first surrounding portion 22. The thickness t2 is smaller than the thickness t3. The first surrounding portion 22 is formed around the connection portion 21 and the second surrounding portion 23 is formed around the first surrounding portion 22. The second surrounding portion 23 is located farther away from the connection portion 21 than the first surrounding portion 22.

Figure 2:
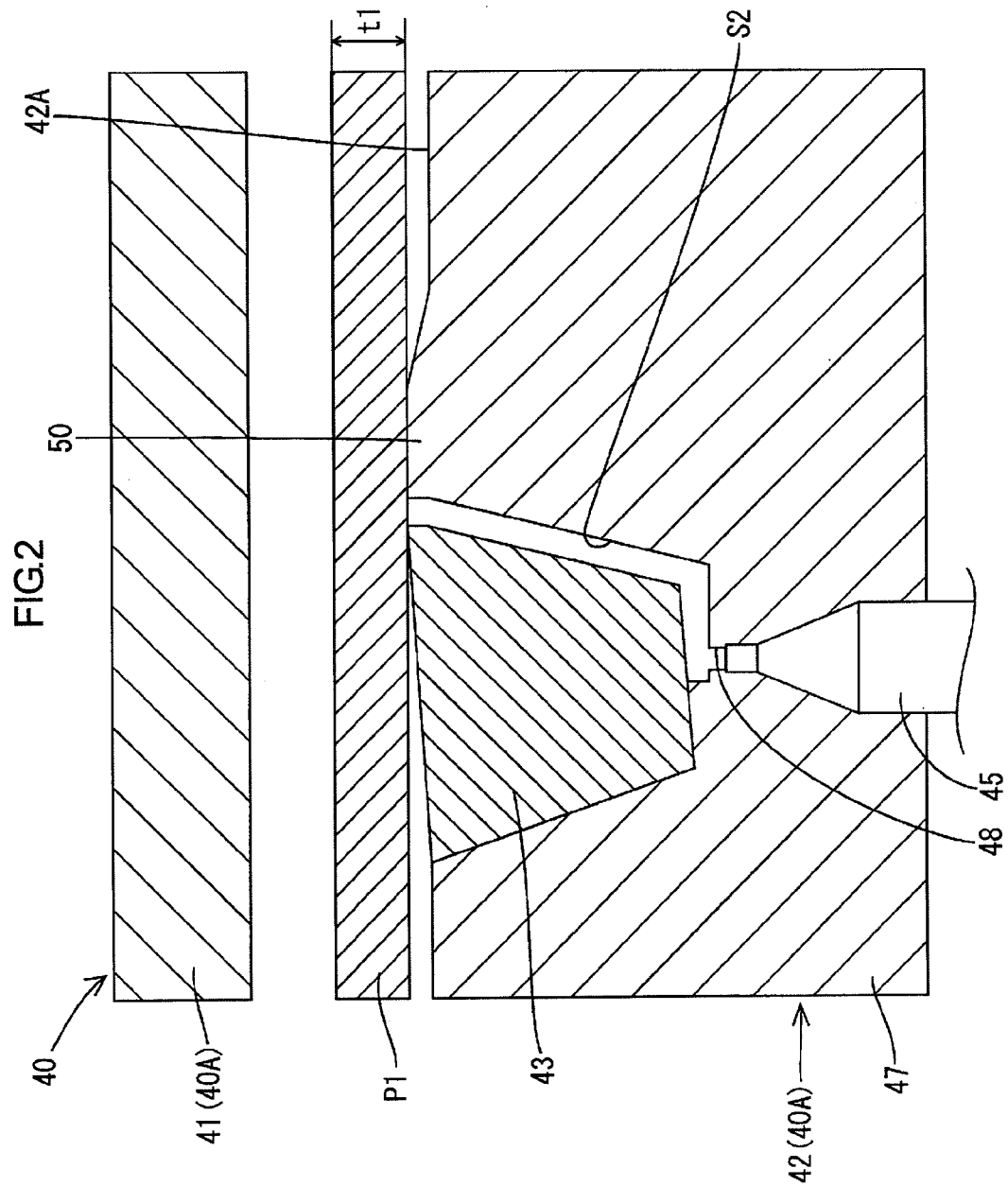
FIG. 2 is a cross-sectional view illustrating the molded structure body before a base member is molded.
Figure 3:
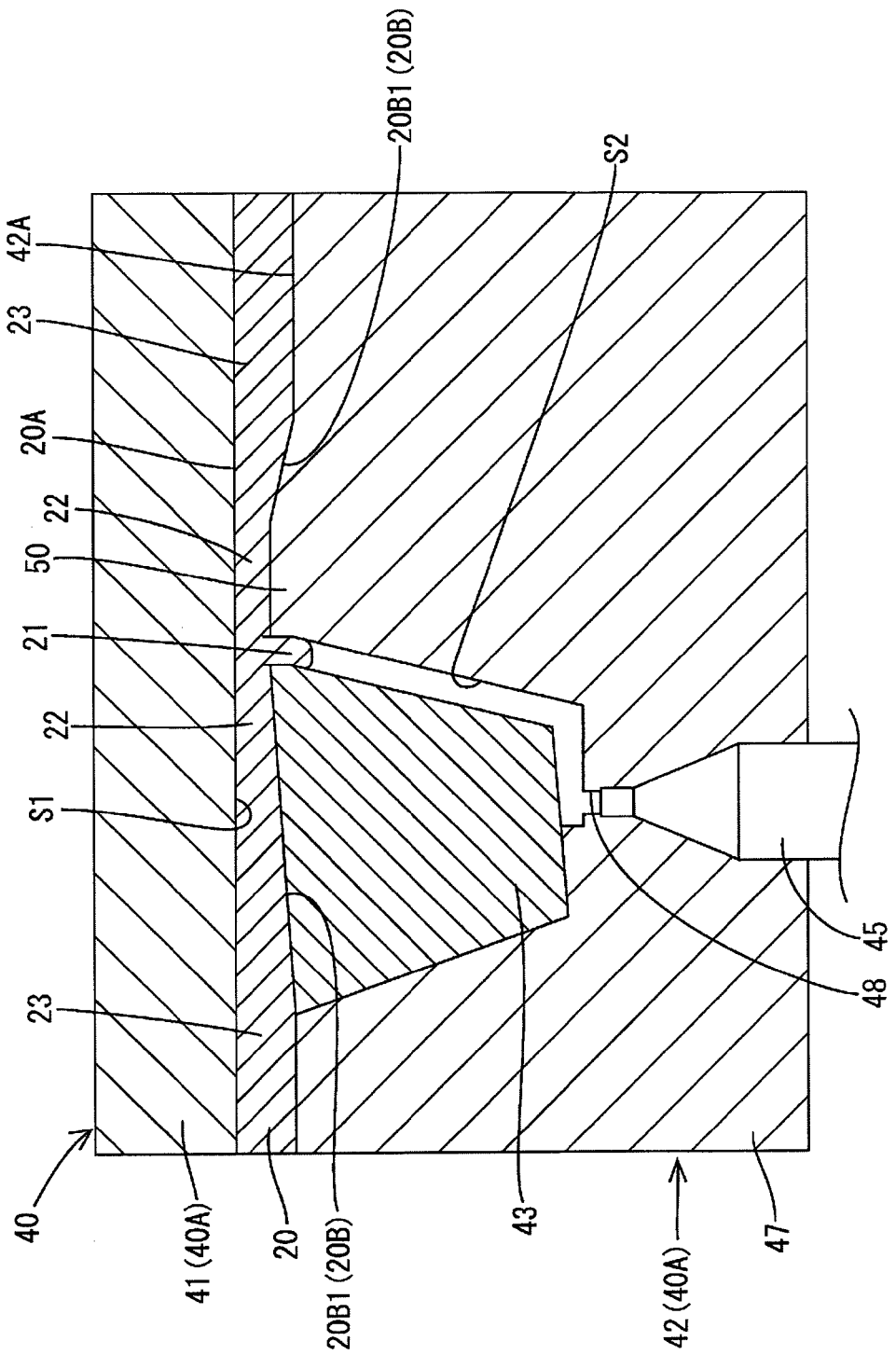
FIG. 3 is a cross-sectional view illustrating the molded structure body after the base member is molded.

As illustrated in FIG. 2, before the board P1 is molded into the trim board 20, the board P1 has a constant thickness t1 and a constant density over its entire area. The board P1 is compressed with press molding by a molding device 40 that will be described later to mold the trim board 20. Accordingly, the first surrounding portion 22 is compressed with a pressure amount or a pressure force greater than the second surrounding portion 23. Therefore, the first surrounding portion 22 is a high density portion having a density higher than the second surrounding portion 23.

The thickness t2 of the first surrounding portion 22 is 60% or less of the thickness t1 of the board P1. The thickness t3 of the second surrounding portion 23 is 90% or less of the thickness t1 of the board P1. The thickness t2 is 60% or less of the thickness t3. The percentages (%) of the thickness t2 and t3 to the thickness t1 and the percentage (%) of the thickness t2 to the thickness t3 are not limited to the above values but may be altered if necessary.

A thickness of the trim board 20 decreases from the second surrounding portion 23 to the first surrounding portion 22. Specifically, an intermediate portion is provided between the first surrounding portion 22 and the second surrounding portion 23 and a rear surface 20B of the trim board 20 corresponding to the intermediate portion is a sloped surface 20B1. The rear surface 20B is a surface to which the bracket 30 is molded. Therefore, a density of the trim board 20 increases gradually or linearly from the second surrounding portion 23 to the first surrounding portion 22. A front surface 20A of the trim board 20 is a flat surface and a design surface. The trim board 20 is a surface opposite to the surface with which the bracket 30 is molded.

The molding device 40 for producing the door trim 10 will be explained. The molding device 40 according to the present embodiment is an injection molding device and includes a molding tool 40A and an injection device 45.

The injection device 45 is a screw type injection device and provided to the lower mold 42 in the present embodiment. A gate 48 is provided in an inner portion of the lower mold 42. The melted resin passes through the gate 48. A bracket molding space S2 (a cavity) is formed in the lower mold 42 for molding the bracket 30 and the gate 48 is communicated with the bracket molding space S2. With this configuration, the melted resin is injected from the injection device 45 into the bracket molding space S2 through the gate 48.

The upper mold 41 is a movable mold that is moved with respect to the lower mold 42 by a driving device such as an electric motor, an air cylinder or a hydraulic cylinder. The upper mold 41 is moved to be far from and close to the lower mold 42 and this allows the molding tool 40A to be closed and open. In the following, if the upper mold 41 and the lower mold 42 of the molding tool 40A are closed, the molding tool 40A is in a closed state, and if the upper mold 41 and the lower mold 42 are open, the molding tool 40A is in an open state.

As illustrated in FIG. 1, the lower mold 42 is arranged to be away from the upper mold 41 by the thickness of the trim board 20 in the closed state. Accordingly, a base member molding space S1 is formed between the upper mold 41 and the lower mold 42 for molding the trim board 20. With this structure, if the board P1 is pressed by the upper mold 41 and the lower mold 42, the board P1 is compressed to be formed into a shape following the base member molding space S1. As a result, the trim board 20 is molded. The bracket molding space S2 is communicated with the base member molding space S1 and the communication portion corresponds to the connection portion 21 of the trim board 20.

The lower mold 42 has a facing surface 42A that faces the upper mold 41 and the facing surface 42A has a convex portion 50A that is convex toward the upper mold 41. The first surrounding portion 22 of the trim board 20 is formed by the convex portion 50. Accordingly, the first surrounding portion 22 has a smaller thickness and a higher density than the second surrounding portion 23. The base member molding space S1 and the bracket molding space S2 are communicated with each other at a top end of the convex portion 50. The convex portion 50 is formed in substantially a trapezoidal cross sectional shape and a convex amount increases as is close to the communication portion of the base member molding space S1 and the bracket molding space S2.

As illustrated in FIG. 1, the lower mold 42 includes a main body 47 and a slide mold 43 that moves slidably with respect to the main body 47. The slide mold 43 is moved to be slid by a driving device (not illustrated) and accordingly, the distal end wall 31 that is an undercut portion of the bracket 30 is separated from the lower mold 42. The slide mold 43 configures a part of the bracket molding space S2 and a part of a convex portion 50. The configuration of the slide mold 43 is not limited to the one illustrated in FIG. 1 but may be altered if necessary.

Next, a method of producing the door trim 10 by the molding device 40 will be explained with reference to FIGS. 1 to 3. The method of producing the door trim 10 according to the present embodiment includes a board molding process for molding the board P1, a base member molding process for molding the board P1 into the trim board 20, and a molded member molding process for molding the bracket 30 with the trim board 20.

<Board Molding Process>

In the board molding process, a mat material obtained by mixing the fibers and polypropylene is heated and molded with press molding, and the molded member is cut into pieces each having a predetermined length, thereby providing the board P1. For example, the molded member is cut into pieces each having a length longer than a length of the trim board 20 after molding. The board P1 is in a heated state just after the molding process, and polypropylene contained in the board P1 is softened.

<Base Member Molding Process>

As illustrated in FIG. 2, the board P1 molded in the board molding process is heated again such that the polypropylene is melted and softened and the heated board P1 is set to the lower mold 42 that is in the open state. Then, as illustrated in FIG. 3, the upper mold 41 and the lower mold 42 are closed. Accordingly, the board P1 is compressed with press molding by the molding tool 40A and the trim board 20 is molded. In closing the upper mold 41 and the lower mold 42, a peripheral edge portion of the board P1 may be subjected to be shear by the upper mold 41 and the lower mold 42 and cut out.

In this molding process, a portion of the board P1 that corresponds to the bracket molding space S2 is not compressed by the molding tool 40A or compressed with a smaller pressure amount or a smaller pressure force compared to other portions. Accordingly, the portion of the board P1 corresponding to the bracket molding space S2 is projected compared to the surrounding portion and has a thickness greater than the surrounding portion, as illustrated in FIG. 3. The projected portion is the connection portion 21 of the trim board 20 that is to be connected to the bracket 30.

In the present embodiment, the convex portion 50 is formed in the lower mold 42. Therefore, the trim board 20 is compressed with press molding such that the portion of the trim board 20 corresponding to the convex portion 50 has a thickness smaller than the portion of the trim board 20 corresponding to the surrounding portion around the convex portion 50. Namely, the thickness of the first surrounding portion 22 that is located around the connection portion 21 is smaller than the thickness of the second surrounding portion 23. Accordingly, the density of the first surrounding portion 22 is higher than that of the second surrounding portion 23. Namely, the first surrounding portion 22 is a high density portion. The density of the connection portion 21 is lower than that of the second surrounding portion 23, for example.

The convex portion 50 is formed such that the projection amount increases as is close to a middle portion thereof. Accordingly, the trim board 20 is molded such that the thickness thereof decreases gradually from the second surrounding portion 23 toward the first surrounding portion 22.

<Molded Member Molding Process>

Next, in a state that the trim board 20 is pressed by the molding tool 40A, the melted resin is injected into the bracket molding space S2 via the gate 48 by the injection device 45. In the injection, a temperature of the trim board 20 is set such that polypropylene contained in the trim board 20 is softened. The injected melted resin reaches the connection portion 21 and presses softened polypropylene contained in the trim board 20 downwardly and penetrate the fibers instead of the softened polypropylene.

At the same time, the melted resin penetrating the fibers is mixed with the softened polypropylene contained in the trim board 20 and the melted resin and the softened polypropylene are blended together (mixed melting). Thus, the bracket molding space S2 is filled with the melted resin, and thereafter the melted resin is cooled down. Accordingly, the bracket 30 is molded and connected with the trim board 20, as illustrated in FIG. 1. Then, the upper mold 41 and the lower mold 42 are open and the slide mold 43 is moved, and the trim board 20 that is molded integrally with the bracket 30 is separated from the molding tool 40A. Thus, the door trim 10 is produced.

In the present embodiment, the connection portion 21 has a relatively low density. Therefore, the melted resin injected into the bracket molding space S2 easily penetrates the inner portion of the connection portion 21 that includes spaces between the fibers of the connection portion 21. This improves bonding strength due to the anchoring effects. The injected melted resin is mixed with the softened polypropylene contained in the trim board 20 and this improves bonding strength due to the welding effects.

Effects of the present embodiment will be explained. The door trim 10 of the present embodiment includes the trim board 20 containing thermoplastic resin and the bracket 30. The bracket is connected to and molded with the trim board 20 by injection of the melted resin to the trim board 20. On the trim board 20, the first surrounding portion 22 located around the connection portion 21 that is connected to the bracket 30 has a density higher than the second surrounding portion 23 located around the first surrounding portion 22. The first surrounding portion 22 is a high density portion.

According to the present embodiment, the first surrounding portion 22 that is located around the connection portion 21 that is connected to the bracket is a high density portion having a density higher than the second surrounding portion 23 located around the first surrounding portion 22. With this configuration, in molding the bracket 30 with injection of the melted resin to the connection portion 21 of the trim board 20, the melted resin is less likely to penetrate the first surrounding portion 22 compared to a configuration in which the first surrounding portion 22 and the second surrounding portion 23 have a same density. Therefore, the melted resin does not emerge from the surface of the first surrounding portion 22.

Thus, the melted resin is less likely to reach the surrounding portion around the connection portion 21. Accordingly, the bonding area in which the trim board 20 and the bracket 30 are bonded to each other is less likely to increase. Also, a convex portion or a concave portion is less likely to be generated due to thermal contraction on a surface of the trim board 20 opposite to the surface having the connection portion 21. In the present embodiment, the first surrounding portion 22 located around the connection portion 21 that is connected to the bracket 30 has a high density, and this improves the strength of the portion in the vicinity of the connection portion 21.

An entire area of the trim board 20 may have a density or a thickness same as the first surrounding portion 22 that is the high density portion. With this configuration, the above effects can be obtained and the melted resin is less likely to penetrate the first surrounding portion 22. However, if the entire area of the trim board 20 is formed as the high density portion, the thickness of the trim board 20 becomes smaller in its entire area, and this makes the trim board 20 to be easily distorted and have low rigidity. Therefore, in the present embodiment, only the first surrounding portion 22 that is located around the connection portion 21 has a relatively high density. Namely, the portion of the trim board 20 which the melted resin may penetrate in molding of the bracket 30 has a relatively high density. This achieves the configuration in which design and strength of the portion in the vicinity of the connection portion 21 are improved and the trim board 20 is less likely to be distorted.

The method of producing the door trim 10 according to the present embodiment is a method of producing the door trim 10 including the trim board 20 containing fibers and thermoplastic resin and the bracket 30 that is molded with the trim board 20. The method includes the base member molding process and the molded member molding process. In the base member molding process, the board P1 is molded with press molding by the molding tool 40A to form the trim board 20. In the molded member molding process, the trim board 20 is pressed by the molding tool 40A and in this state, the melted resin is injected into the bracket molding space S2 formed in the molding tool 40A. Accordingly, the bracket 30 is connected to and molded with the trim board 20. In the base member molding process, the trim board 20 is molded with press molding such that the thickness t2 of the first surrounding portion 22 located around the connection portion 21 that is connected to the bracket 30 is smaller than the thickness t3 of the second surrounding portion 23 located around the first surrounding portion 22. Accordingly, the first surrounding portion 22 has the density higher than the second surrounding portion 23.

According to the method of the present embodiment, in the process of molding the bracket 30 with the injection of the melted resin into the bracket molding space S2, the melted resin is less likely to penetrate the first surrounding portion 22 compared to the configuration in which the first surrounding portion 22 and the second surrounding portion 23 have a same density. The trim board 20 is molded with press molding by the molding tool 40A such that the thickness t2 of the first surrounding portion 22 is smaller than the thickness t3 of the second surrounding portion 23. In this molding process, the pressure applied to the first surrounding portion 22 (the lower mold 42) by the molding tool 40A tends to be greater than the pressure applied to the second surrounding portion 23 (the lower mold 42). Namely, the trim board 20 is pressed with a greater force at the portion on which the convex portion 50 is formed. Accordingly, a gap is less likely to be generated between the lower mold 42 (the convex portion 50) and the first surrounding portion 22. Therefore, in the base member molding process, the melted resin is further less likely to enter a gap between the molding tool 40A (the lower mold 42) and the first surrounding portion 22.

According to the present embodiment, the melted resin is less likely to reach a surrounding portion of the trim board 20 that is located around the connection portion 21. Accordingly, a contact area in which the trim board 20 and the bracket 30 are bonded to each other is less likely to increase. As a result, any convex portion or concave portion is less likely to be generated on a surface of the trim board 20 that is opposite to the surface on which the connection portion 21 is formed, and the convex portion or concave portion may be generated due to thermal contraction of the bracket 30. The density of the first surrounding portion 22 that is located around the connection portion 21 that is connected to the bracket is increased and this increases strength of the portion close to the connection portion 21. The trim board 20 is compressed with press molding such that the thickness t2 of the first surrounding portion 22 is smaller than the thickness t3 of the second surrounding portion 23. Accordingly, the density of the first surrounding portion 22 is relatively high and such a high density portion is easily molded.

The trim board 20 is formed in a plate shape and the thickness of the trim board 20 decreases in a gradual manner as is closer to the first surrounding portion 22 from the second surrounding portion 23.

Generally, if the trim board 20 includes a local portion having a density different from other portion, the local portion is likely to be viewed as a portion different from the other portion and this may deteriorate its design. In the present embodiment, the thickness of the trim board 20 decreases in a gradual manner as is close to the first surrounding portion 22 from the second surrounding portion 23. With this configuration, the density changes between the first surrounding portion 22 and the second surrounding portion 23 by changing the thickness of the trim board 20, and accordingly, the density increases in a gradual manner as is closer to the first surrounding portion 22 from the second surrounding portion 23. Therefore, a border between the first surrounding portion 22 and the second surrounding portion 23 each of which has a different density is less likely to be distinct and its design is less likely to be deteriorated.

Second Embodiment

Figure 4:
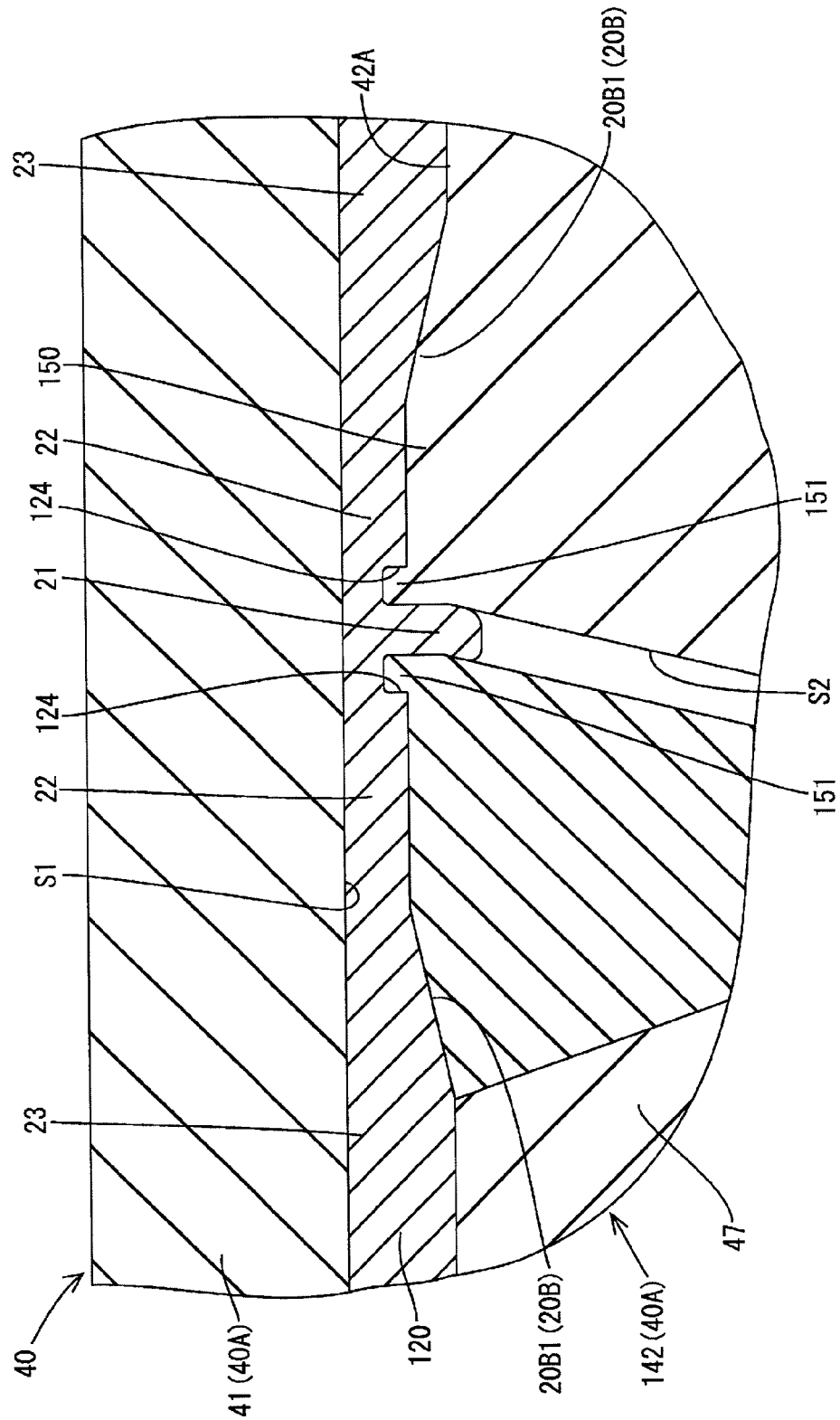
FIG. 4 is a cross-sectional view illustrating a molded structure body according to a second embodiment.
Figure 5:
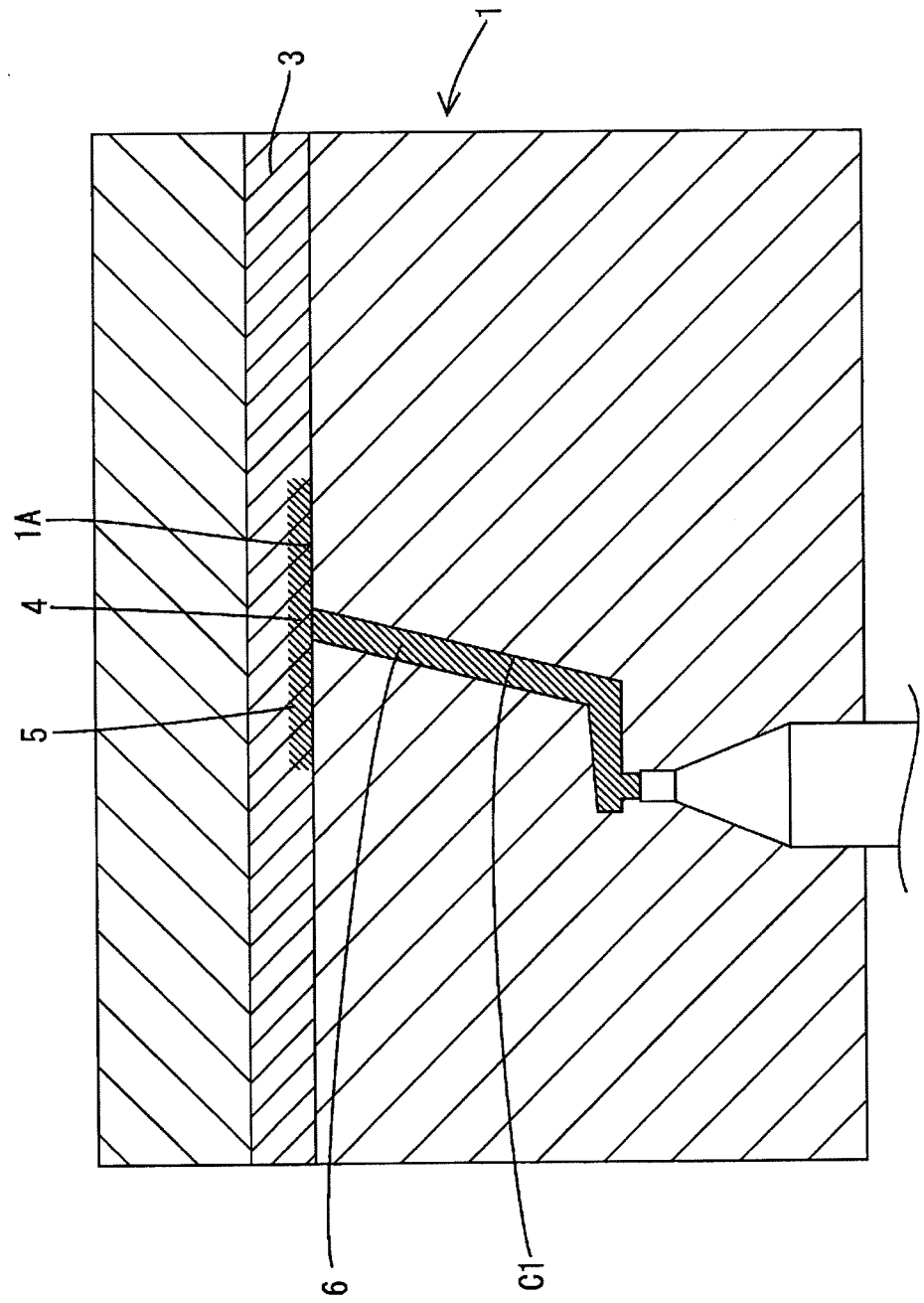
FIG. 5 is a cross-sectional view illustrating a molded structure body in a producing process according to a related art.
Figure 6:
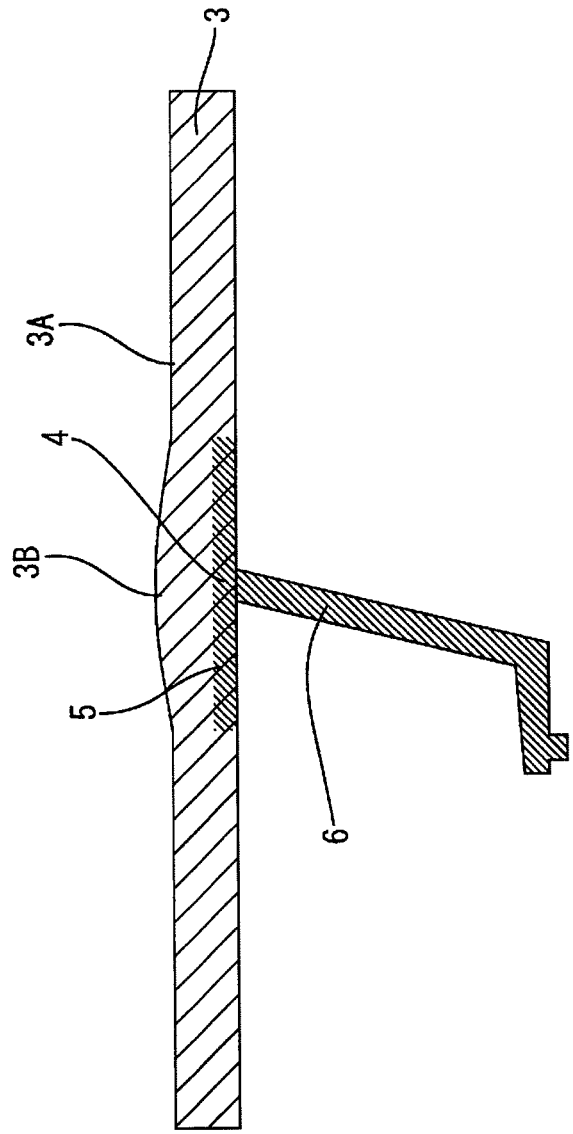
FIG. 6 is a cross-sectional view illustrating the molded structure body according to the related art.

A second embodiment will be explained with reference to FIG. 4. Same numerals or symbols are applied to the components same as those in the first embodiment and the same components will not be explained. A configuration of the second embodiment includes a lower mold 142 and a trim board 120 that are different from the first embodiment.

The lower mold 142 includes a convex portion 150 and further includes a projection 151. The projection 151 is formed around an opening of the bracket molding space S2. Accordingly, in the base member molding process, the board P1 is pressed by the second projection 151 and a groove 124 is formed around the connection portion 21.

With this configuration, the portion of the board P1 corresponding to the projection 151 is further compressed by the projection 151 in the base member molding process compared to the configuration without having the second projection 151. As a result, the portion of the first surrounding portion 22 close to the groove 124 has a higher density. The projection 151 is provided on a portion of the convex portion 50 and therefore, a gap is less likely to be generated between the projection 151 and the trim board 20. Accordingly, the melted resin is less likely to penetrate the first surrounding portion 22.

In the second embodiment, the convex portion 150 of the lower mold 142 is formed in a shape different from the convex portion 50 of the first embodiment and the bracket molding space S2 is formed in a different portion from the first embodiment. In the second embodiment, the convex portion 150 is formed in a symmetrical shape with respect to an opening of the bracket molding space S2 in an elongated direction of the trim board 120 in which the trim board 120 extends (in a right-left direction in FIG. 4). A surface of the slide mold that forms the facing surface 42A of the lower mold 42 includes a flat surface and the sloped surface 20B1. The bracket molding space S2 is formed in substantially a middle portion of the convex portion 150 in the elongated direction of the trim board 120. The shape of the convex portion and the portion in which the bracket molding space S2 is formed are not limited thereto but may be altered if necessary.

Third Embodiment

A third embodiment will be explained with reference to FIGS. 7 to 13. A door trim 210 (a molded structure body) is mounted to a vehicular door and includes a trim board 220 (a base member), a mounting boss 230 (a molded member, a utility part) that is connected to the trim board 220.

Figure 8:
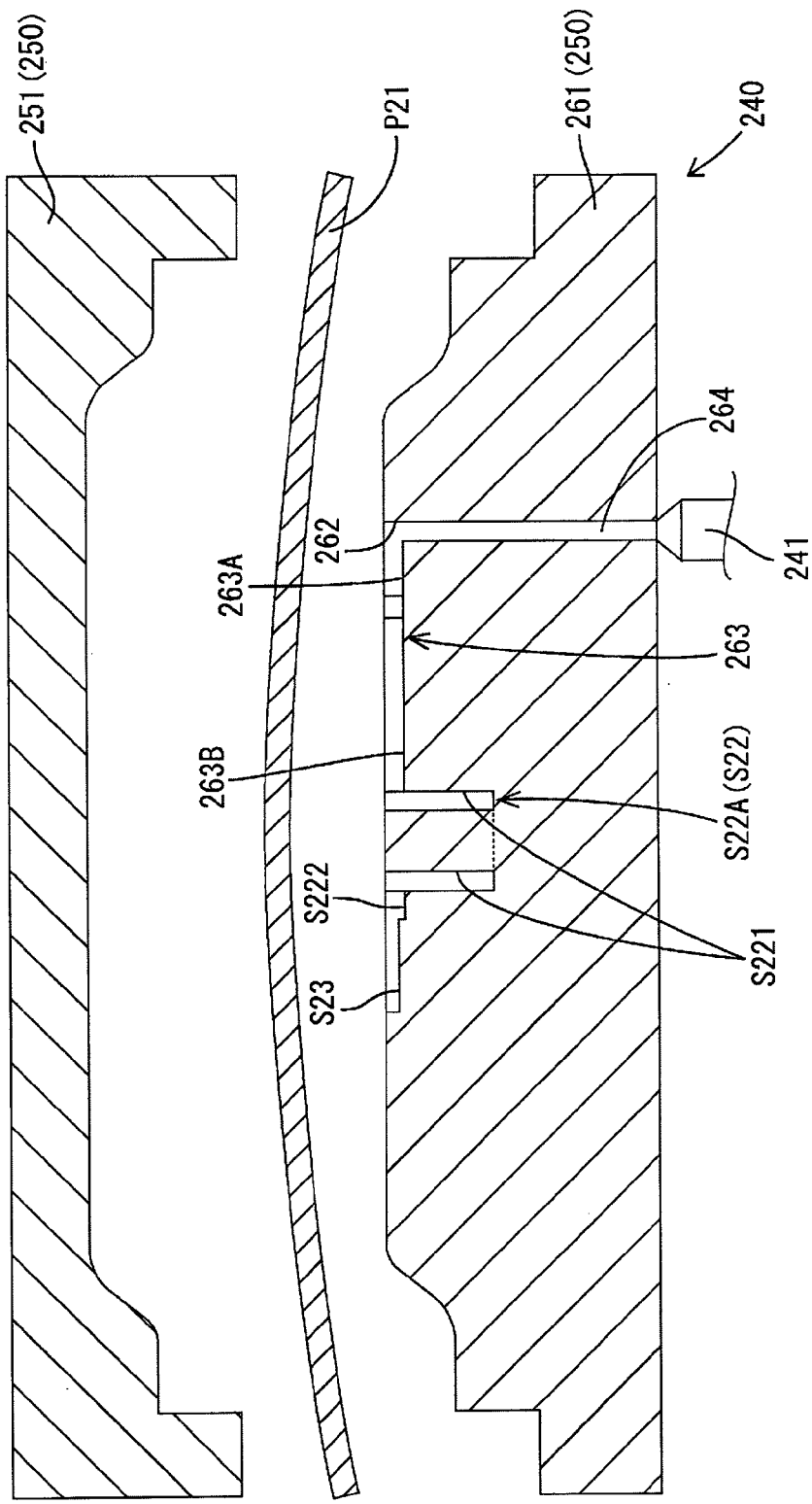
FIG. 8 is a cross sectional view illustrating a board and a molding device in an open state before a trim board is molded.

The trim board 220 is formed in substantially a flat plate and configured with fibers and polypropylene that is impregnated in the fibers. Polypropylene is one of thermoplastic resins. A board P21 formed in a mat is compressed with press molding to decrease a thickness thereof, as illustrated in FIG. 8. Accordingly, the trim board 220 is formed to have a density higher than the board P21. The fibers used for the trim board 220 include wood fibers obtained by fiberizing woods or bast fibers such as kenaf. However, the fibers are not limited thereto.

Figure 7:
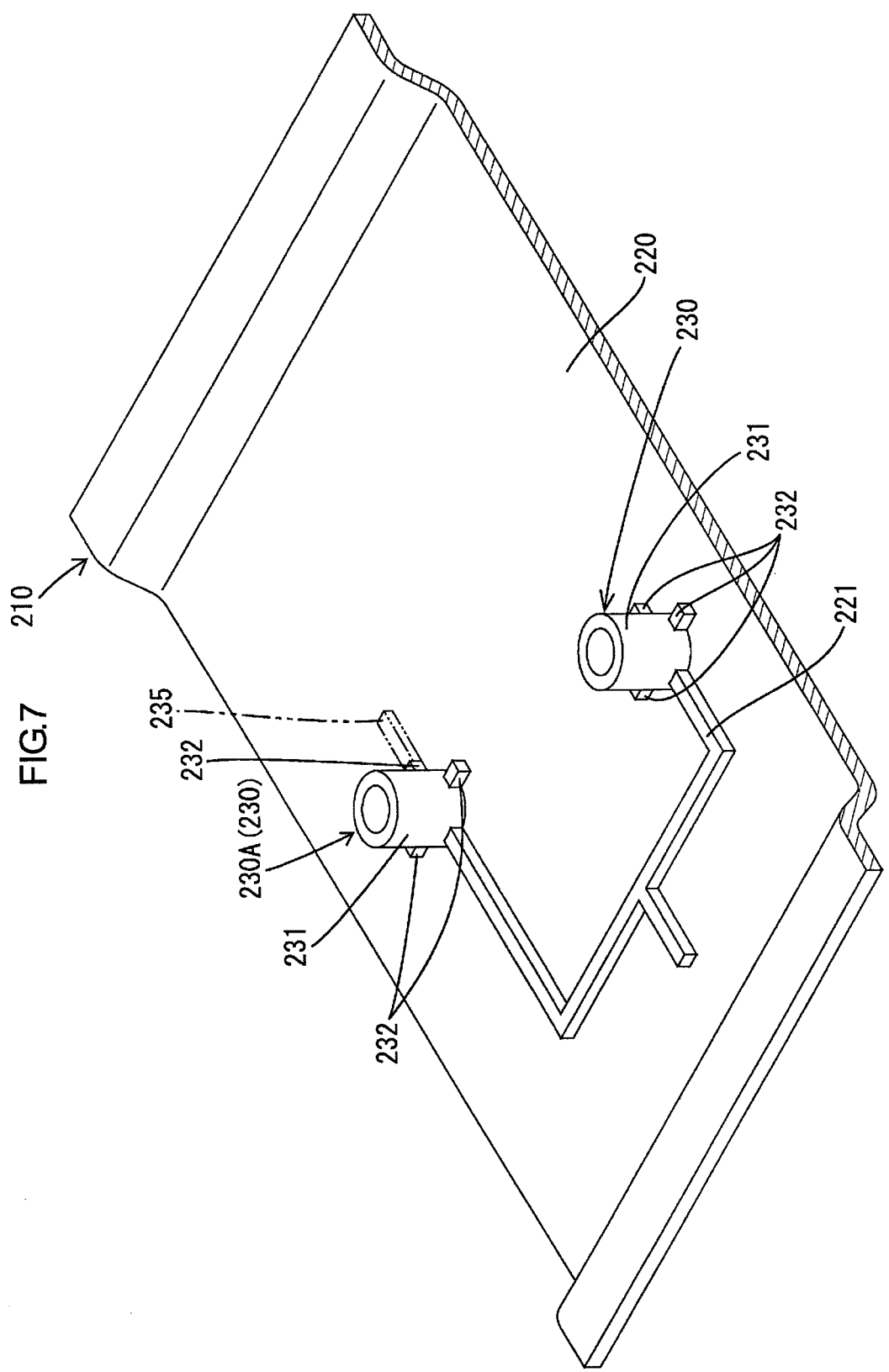
FIG. 7 is a perspective view illustrating a molded structure body according to a third embodiment.

Polypropylene contained in the trim board 220 functions as a binder that connects the fibers. The trim board 220 may be formed of only polypropylene or only other thermoplastic resin or may be formed of a mixture of fibers and a thermoplastic resin other than polypropylene such as polyethylene terephthalate. The trim board 220 has a step at a peripheral portion as illustrated in FIG. 7. However, the peripheral portion of the trim board 220 is not necessarily formed in such a shape.

The mounting boss 230 is formed of polypropylene that is a thermoplastic resin. As illustrated in FIG. 7, the mounting boss 230 is formed to be projected from a rear surface of the trim board 220 that is a surface close to an inner side of a vehicular compartment. The mounting boss 230 has a main body 231 formed in a cylindrical shape. The main body 231 configures a curved plate wall. The main body 231 is a mounting portion via which a utility part such as a door pocket, an ornament and an armrest is mounted to the trim board 210.

The mounting boss 230 includes a plurality of support ribs 232 each of which extends from a basal end of the main body 231 that is connected to the trim board 220. Three support ribs 232 extend from the main body 231 in three directions in a plan view, respectively. This increases bonding strength of the main body 231 and the trim board 220.

The melted resin is injected to the trim board 220 that is set to a molding tool 50 and accordingly, the mounting boss 230 is molded. The mounting boss 230 is bonded and molded with the trim board 220.

A plurality of mounting bosses 230 are formed on the trim board 220. In the present embodiment, two mounting bosses 230 are formed on the trim board 220. The melted resin is injected from a gate 262 (refer to FIG. 11) provided in the molding tool 50 and the melted resin flows thorough a runner 263 (a resin flowing path) that is branched into two. Accordingly, the two mounting bosses 230 are molded.

As illustrated in FIG. 7, a rib 221 extends from each of the mounting bosses 230 and the rib 221 is formed on a rear surface of the trim board 220. The melted resin filled in the runner 263 in molding the mounting bosses 230 is cooled down and the rib 221 is formed. Namely, the rib 221 is formed in a shape following the runner 263. In the present embodiment, non-woven fabric may be adhered to the rear surface of the trim board 220 or specifically may be provided between the rear surface of the trim board 220 and the rib 21. The non-woven fiber having a flat surface is adhered to the surface of the trim board 220 having a relatively rough surface, and this enables the melted resin to flow along the flat surface of the non-woven fiber easily. Namely, the melted resin flows through the runner 263 easily and smoothly.

Figure 12:
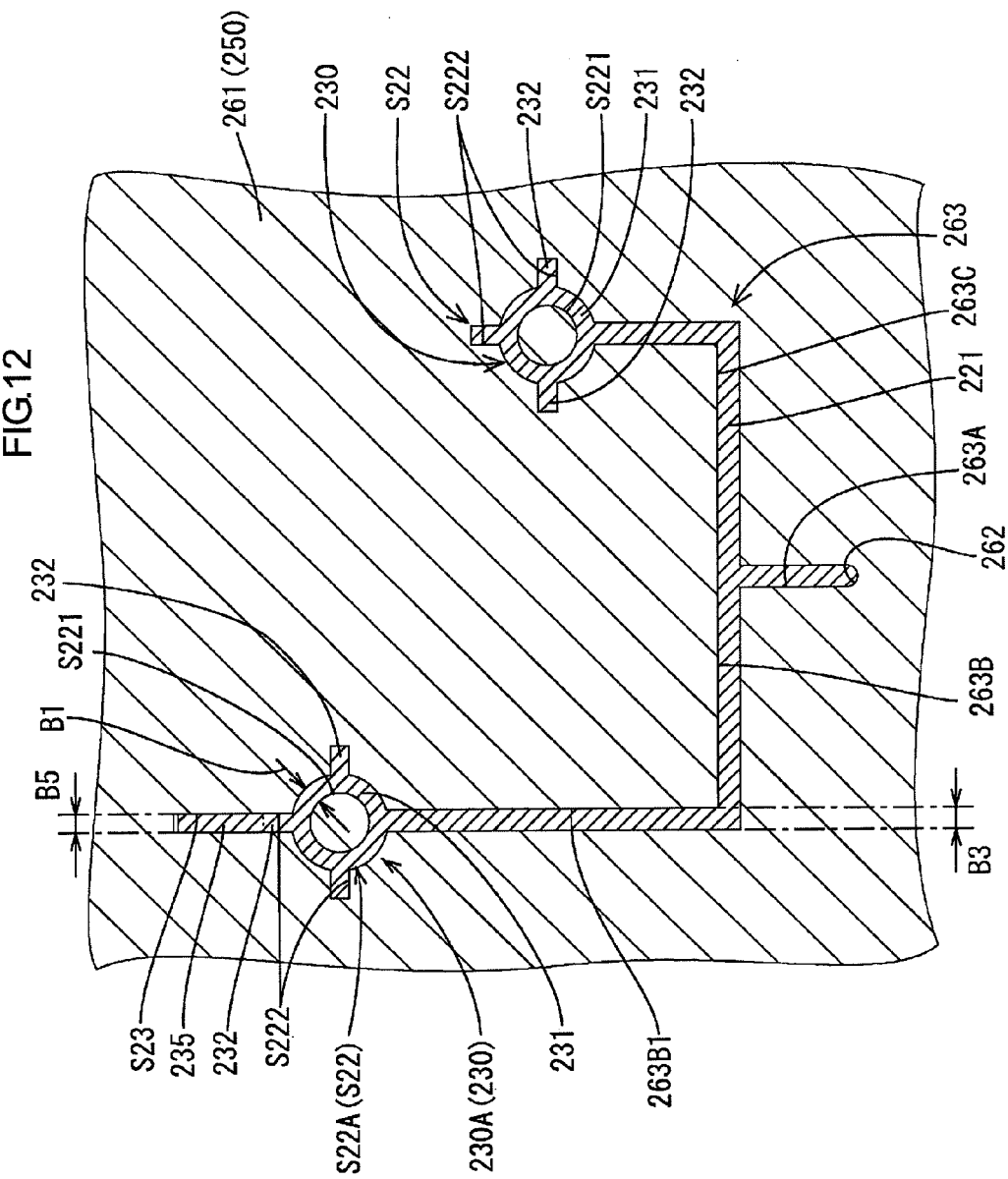
FIG. 12 is a cross sectional view illustrating the lower mold in which the melted resin is injected into the mounting boss molding space.

As illustrated in FIGS. 7 and 12, one of the two mounting bosses 30 integrally includes a check portion 235 that is formed in a rib or a plate. The check portion 235 is provided to one of the three support ribs 232 that is farthest from the rib 21. The check portion 235 extends from the one of the three ribs 232 so as to be farther away from the rib 21. As illustrated in FIG. 12, a thickness B5 of the check portion 235 is smaller than a thickness B1 of the main body 231 of the mounting boss 230.

Figure 10:
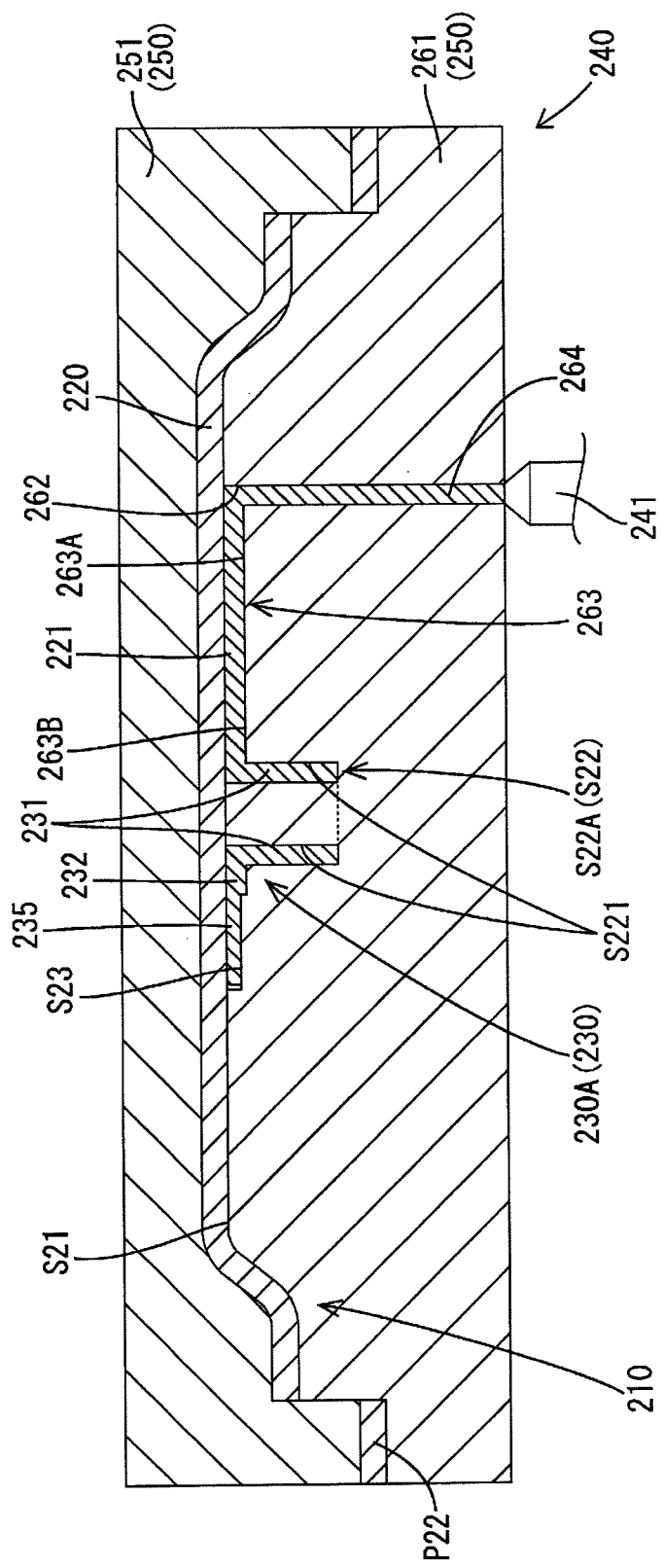
FIG. 10 is a cross sectional view illustrating the trim board and the molding device in a closed state when melted resin is injected into a mounting boss molding space.

As illustrated in FIG. 10, the check portion 235 has a projected dimension from the trim board 220 that is slightly smaller than the support rib 232. The projected dimension of the check portion 235 from the trim board 220 may be altered if necessary. For example, the check portion 235 and the support rib 232 may have a same projected dimension from the trim board 220.

An operator checks the check portion 35 with his/her eyes to confirm whether the melted resin is surely filled in a molding space (a mounting boss molding space S22) for molding the mounting boss 230. By checking the check portion 235, the operator can confirm whether the mounting boss 230 is formed in a complete form. The check portion 235 may be removed from the door trim 210 in shipping of the door trim 210. The check portion 35 is illustrated with a two-dot chain line in FIG. 7. The check portion 235 may not be described on a design drawing of the door trim 10.

Next, a molding device 240 for producing the door trim 10 will be explained. The molding device 240 of the present embodiment is an injection molding device and includes an injection device 241 and the molding tool 250. The molding tool 250 includes an upper mold 251 and a lower mold 261. The injection device 241 is a screw-type injection device and is provided to the lower mold 261 in the present embodiment.

Figure 9:
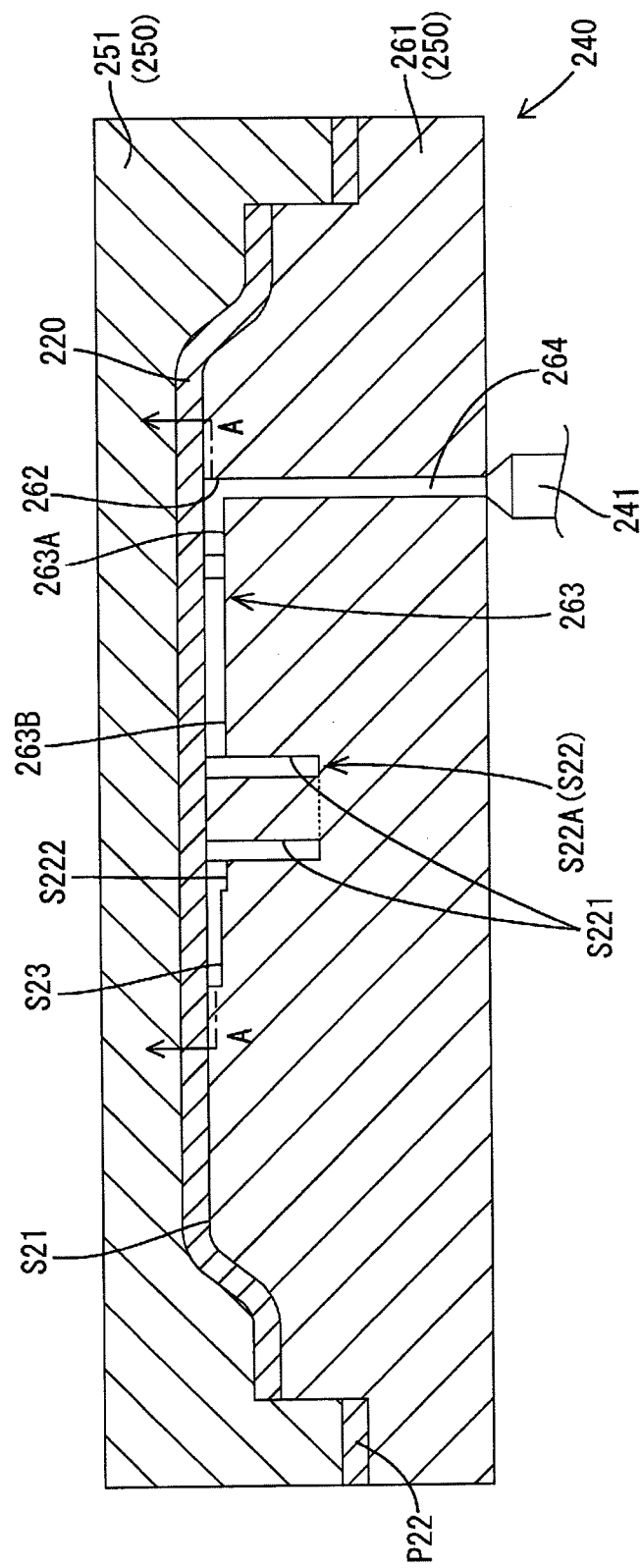
FIG. 9 is a cross sectional view illustrating the trim board and the molding device in a closed state taken along a D-D line in FIG. 5.

The upper mold 251 is a movable mold that is moved with respect to the lower mold 261 by a driving device such as an electric motor, an air cylinder or a hydraulic cylinder. The upper mold 251 is moved to be far from and close to the lower mold 261 and this allows the molding tool 250 to be closed and open. In the following, if the upper mold 251 and the lower mold 261 of the molding tool 250 are closed as illustrated in FIGS. 9 and 10, the molding tool 250 is in a closed state, and if the upper mold 251 and the lower mold 261 are open as illustrated in FIG. 8, the molding tool 250 is in an open state.

The lower mold 261 is formed such that a surface thereof facing the upper mold 251 is convex toward the upper mold 251. The upper mold 251 is formed such that a surface thereof facing the lower mold 261 is recessed to follow the shape of the lower mold 261. As illustrated in FIG. 9, the upper mold 251 is arranged to be away from the lower mold 261 by the thickness of the trim board 220 in the closed state. Namely, a base member molding space S21 for molding the trim board 20 is formed between the lower mold 261 and the upper mold 251 in the closed state. With this structure, if the board P21 is pressed by the upper mold 251 and the lower mold 261, the board P21 is compressed to be formed into a shape following the base member molding space S21.

A hot runner 264 is formed in the lower mold 261. The hot runner 264 is connected to the injection device 241. The hot runner 264 is connected to the injection device 241 at its one end and is connected to the runner 263 at its other end. A gate 262 is provided at the other end of the hot runner 264 close to the runner 263. Namely, the gate 262 is a resin injection outlet through which the melted resin flows into the runner 263.

Figure 11:
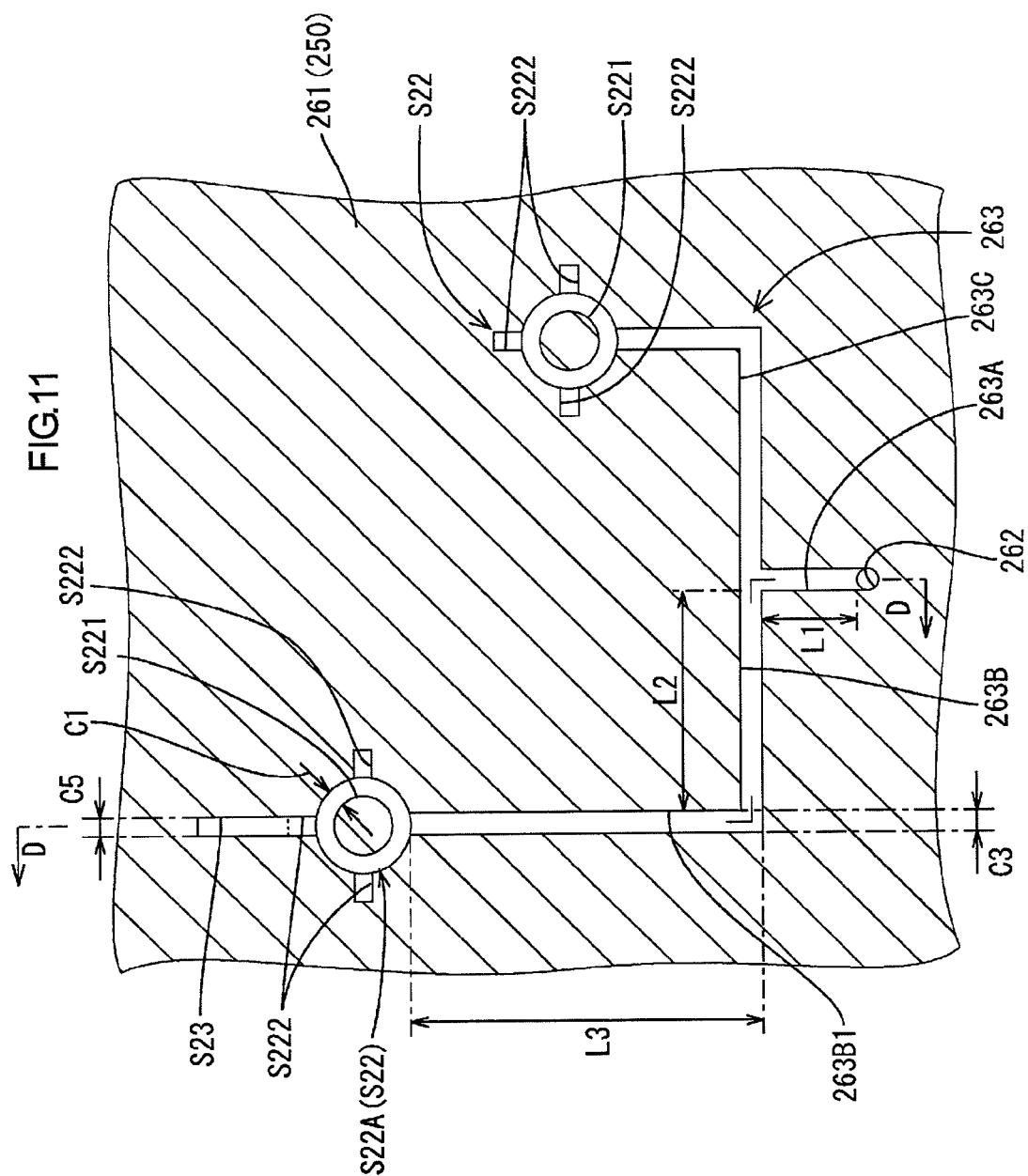
FIG. 11 is a cross sectional view illustrating a lower mold taken along an A-A line in FIG. 3.

A mounting boss molding space S22 that is a cavity for molding the mounting boss 230 is formed in the lower mold 261. As illustrated in FIG. 11, the mounting boss molding spaces S22 are formed in the lower mold 261 corresponding to the number of the mounting bosses 230. In the present embodiment, two mounting boss molding spaces S22 are formed.

The runner 263 is communicated with each of the mounting boss molding spaces S22. Specifically, as illustrated in FIG. 11, the runner 263 includes a main passage 263A communicated with the gate 262 and a first branch passage 263B and a second branch passage 263C that are branched from the main passage 263A. Each of the first branch passage 263B and the second branch passage 263C is communicated with each of the mounting boss molding spaces S22. With this configuration, the melted resin is injected from the injection device 241 into the mounting boss molding spaces S22 through the gate 262 and the runner 263. Accordingly, one injection device 41 is required to inject the melted resin through the gate 262 into a plurality of mounting boss molding spaces and a plurality of mounting bosses 230 are molded with a simple configuration.

The mounting boss molding spaces S22 are formed in the surface of the lower mold 261 that faces the upper mold 251. Each of the mounting boss molding spaces S22 has an opening communicated with an external space. When the molding tool 250 is in the closed state, as illustrated in FIG. 9, the base member molding space S21 is communicated with each of the mounting boss molding spaces S22. The communication portion between the base member molding space S21 and each mounting boss molding space S22 corresponds to a connection portion between the trim board 220 and each mounting boss 230.

Each mounting boss molding space S2 includes a main body molding space S221 for molding the main body 231 of the mounting boss 230 and a plurality of support rib molding spaces S222 for molding each of the support ribs 232 of the mounting boss 230. The main body molding space S221 is formed to be recessed in the lower mold 261 so as to follow a cylindrical shape of the main body 231. Each of the support rib molding spaces S222 is formed in a groove so as to follow a plate shape of the support rib 232.

A check portion molding space S23 that is a cavity is formed to be communicated with one of the mounting boss molding spaces S22 (S22A) that is located to be farther from the gate 262 or has a resin flow path longer than the other one of the mounting boss molding spaces S22. The check portion molding space S23 is communicated with one of the mounting boss molding spaces S22 having the longest resin flow path from the gate. The check portion molding space S23 is communicated with the support rib molding space S222. The check portion molding space S23 is a molding space for molding the check portion 235.

A length of the resin flow path from the gate 62 corresponds to a total length of a length of the main passage 263A of the runner 263 and a length of one of the first branch passage 263B and the second branch passage 263C. For example, in the present embodiment, a length of the resin flow passage from the gate 262 to the mounting boss molding space S22A is a total of a length L1 of the main passage 263A and a length of the first branch passage 263B that is a total of lengths L2 and L3 as illustrated in FIG. 11. In the present embodiment, the length of the first branch passage 263B that is communicated with the mounting boss molding space S22A is longer than the length of the second branch passage 263C that is communicated with the other mounting boss molding space S22.

As illustrated in FIG. 11, the check portion molding space S23 extends from the mounting boss molding space S22A in a direction that is opposite to a direction in which the first branch passage 263B (the runner 263) extends from the mounting boss molding space S22A. Namely, the runner 263, the mounting boss molding space S22A, the support rib molding space S222 and the check portion molding space S23 are arranged in this order from the gate 262. The first branch passage 263B is formed to be bent at substantially a right angle with a plan view and includes a first straight portion extending from the gate 262 and a second straight portion 263B1 that extends from the first straight portion with angled at substantially a right angle and provided close to the mounting boss molding space S22A. The check portion molding space S23 is provided on a same line with the second straight portion 263B1 of the first branch passage 263B.

The thickness B5 of the check portion 235 is smaller than the thickness B1 of the main body 231 of the mounting boss 230. In a plan view of FIG. 11, a width C5 of the check portion molding space S23 is smaller than a width C1 of the main body molding space S221. As illustrated in FIG. 12, the thickness B5 of the check portion 235 is smaller than the thickness B3 of the rib 221 that is formed following the runner 263. Namely, the width C5 of the check portion molding space S23 is smaller than a width C3 of the runner 263.

In the present embodiment, the width decreases from the width C3 of the runner 263, the width C1 of the main body molding space S221, and the width C5 of the check portion molding space S3 in this order. The width of the melted resin passage of the runner 263, the main body molding space S221, and the check portion molding space WS3 decreases as is farther from the gate 262. With this configuration, the melted resin is less likely to flow into the portion farther from the gate 262.

The width C3 of the runner 263 is 2 mm, and the width C1 of the main body molding space S221 is 1.2 to 1.5 mm, for example. The width C5 of the check portion molding space S23 is 1 mm, for example. Each of the widths C1, C3, C5 is not limited thereto but may be altered if necessary.

In the present embodiment, each of the runner 263, the mounting bosses S22, and the check portion molding space S23 is recessed in a surface of the lower mold 261 that faces the upper mold 251. Each of the runner 263, the mounting bosses S22, and the check portion molding space S23 is open upwardly or toward the upper mold 251. With this configuration, the runner 263, the mounting bosses S22, and the check portion molding space S23 are formed easily by a cutting work, for example.

A method of producing the door trim 10 using the molding device 40 will be explained with reference to FIGS. 8 to 12. The method of producing the door trim 10 according to the present embodiment includes a board molding process, a base member molding process (a base member arrangement process), and a molded member molding process. In the board molding process, the board P21 is molded. In the base member molding process, the trim board 220 is molded from the board P21. In the molded member molding process, the mounting bosses 230 are molded with the trim board 220.

<Board Molding Process>

In the board molding process, a mat material obtained by mixing the fibers and polypropylene is heated and molded with press molding, and the molded member is cut into pieces each having a predetermined length, thereby providing the board P21. For example, the molded member is cut into pieces each having a length longer than a length of the trim board 220 after molding. The board P21 is in a heated state just after the molding process, and polypropylene contained in the board P21 is softened.

<Base Member Molding Process>

As illustrated in FIG. 8, the board P21 molded in the board molding process is heated again such that the polypropylene is melted and softened and the heated board P21 is set to a space between the lower mold 261 and the upper mold 251 that are in the open state. Then, as illustrated in FIG. 9, the upper mold 251 and the lower mold 261 are closed. Accordingly, the board P21 is compressed with press molding by the molding tool 250. In closing the upper mold 251 and the lower mold 261, a peripheral edge portion P22 of the board P21 may be subjected to be shear by the upper mold 251 and the lower mold 261 and cut out. Thus, the trim board 220 is molded by the molding tool 250.

The molded trim board 220 is arranged in the molding tool 250 so as to close the openings of the mounting boss molding spaces S22 and the check portion molding space S23. Namely, in the base member molding process, the trim board 220 is molded and also the trim board 220 is arranged in the molding tool 250 for the subsequent molded member molding process. Therefore, the base member molding process includes a base member arrangement process. Each opening is closed by the trim board 220, and therefore, each of the mounting boss molding spaces S22 and the check portion molding space S23 is formed as a closed space.

<Molded Member Molding Process>

Next, in a state that the trim board 220 is pressed by the molding tool 250 and closes the openings of the mounting boss molding spaces S22 as illustrated in FIG. 9, the melted resin is injected into the runner 263 via the gate 262 by the injection device 241. In the injection, a temperature of the trim board 220 is set such that polypropylene contained in the trim board 220 is softened.

As illustrated in FIGS. 10 and 12, the melted resin injected into the runner 263 flows into each of the mounting boss molding spaces S22 through the runner 263. Accordingly, each of the mounting boss molding spaces S22 is filled with the melted resin. After each of the mounting boss molding spaces S22 is filled with the melted resin or almost at the same time each mounting boss molding space S22 is filled with the melted resin, a part of the melted resin reaches the check portion molding space S23.

In the process of filling each of the mounting boss molding spaces S22 with the melted resin, the injected melted resin presses softened polypropylene contained in the trim board 220 upwardly and penetrates the fibers instead of the softened polypropylene. At the same time, the melted resin penetrating the fibers is mixed with the softened polypropylene contained in the trim board 220 and the melted resin and the softened polypropylene are blended together (mixed melting). Thus, each of the mounting boss molding spaces S22 is filled with the melted resin, and thereafter the melted resin is cooled down. Accordingly, the two mounting bosses 230 are molded and connected with the trim board 220, as illustrated in FIG. 10.

The melted resin injected into the check portion molding space S23 is cooled down and the check portion 235 is molded. Accordingly, one of the two mounting bosses 230 that are molded by the mounting boss molding space S22A integrally includes the check portion 235 with molding. Then, the molding tool 250 is open and the door trim 210 including the trim board 220 and the mounting bosses 30 that are integrally molded and connected with each other is removed from the molding tool 250. This completes the process of producing the door trim 210.

Next, effects of the present embodiment will be explained. According to the present embodiment, the melted resin flows from the gate 262, the mounting boss molding space S22, and the check portion molding space S23 in this order. Accordingly, the check portion 235 is molded in the process of molding the mounting boss 230. Therefore, an operator checks if the check portion 235 is molded or not and confirms that the check portion molding space S23 is filled with the melted resin.

If it is confirmed that the melted resin reaches the check portion molding space S23, it can be determined that each of the mounting boss molding spaces S22 that are located closer to the gate 262 or the injection device 241 than the check portion molding space S23 is filled with the melted resin. An operator can check if the check portion 235 is molded after the door trim 210 is removed from the molding tool 250 and the operator easily confirms that each mounting boss 30 is surely and completely molded. This facilitates the check operation.

Figure 13:
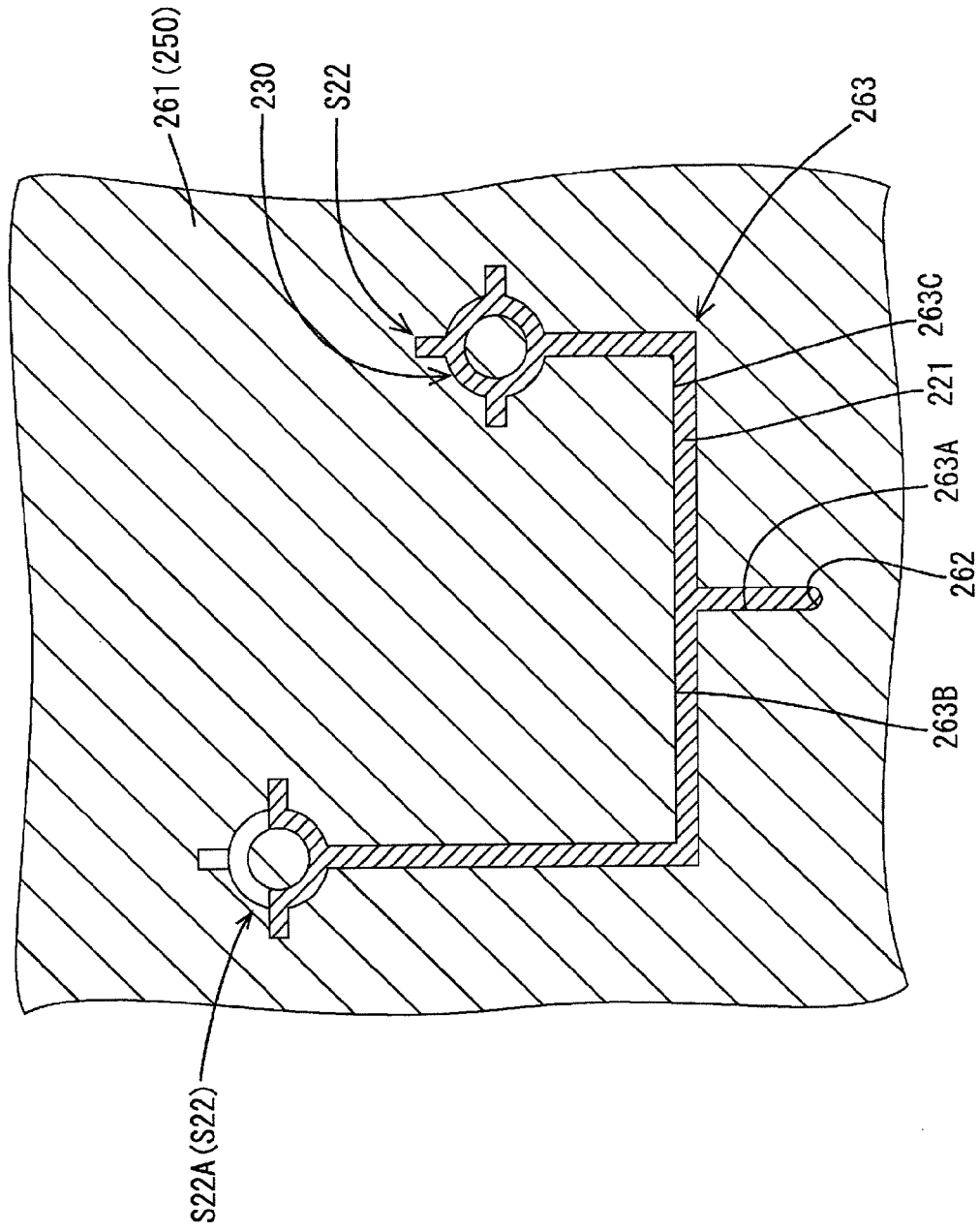
FIG. 13 is a cross sectional view of a lower mold of a comparative example.

In the molded member molding process, if the amount of melted resin injected into the runner 236 is small, each of the mounting boss molding spaces S22 is not sufficiently filled with the melted resin, as illustrated in a comparative example of FIG. 13. In such a case, a part of the mounting boss 230 may not be molded and formed. This deteriorates a quality of a product. Such a problem is likely to occur at a portion far from the gate 262 and having a long resin flow path from the gate 262, for example, the mounting boss molding space S22A in FIG. 13. If the amount of melted resin injected into the runner 263 increases to prevent the missing of a part of the mounting boss 230, the melted resin may leak from a gap between the molding tool and the trim board 220 and this deteriorates a quality of the door trim 210. Further, if the amount of the melted resin injected into a cavity excessively increases, the melted resin may leak from a gap between the molding tool and the base member and this increases a bonding area in which the molded member and the base member are bonded to each other. If the melted resin is cooled down, it is contracted and the contraction generates great stress at the bonding portion of the molded member and the base member. This generates a convex portion and a concave portion on a design surface and this deteriorates a quality of products.

According to the present embodiment, in the injection of the melted resin, if the amount of the melted resin flowing into the mounting boss molding space S22A exceeds the amount of the melted resin required for filling the mounting boss molding space S22, the extra melted resin flows into the check portion molding space S23 that is communicated with the mounting boss molding space S22A, as illustrated in FIG. 12. Accordingly, the extra melted resin is less likely to leak from the gap between the molding tool 250 and the trim board 220. Namely, the check portion molding space S23 is also used as a melted resin escape space to which the melted resin overflowing the mounting boss molding space S22A escapes.

According to the present embodiment, each of the mounting boss molding spaces S22 is surely and sufficiently filled with the melted resin only by increasing the amount of the melted resin injected into the runner 263 to be slightly greater than the amount of the melted resin required for surely and sufficiently filling each mounting boss molding space S22. The amount of the melted resin required for surely and sufficiently filling each mounting boss molding space S22 corresponds to a total of a volume of the runner 263 and a volume of the mounting boss molding spaces S22. Further, extra melted resin overflowing the mounting boss molding space S22 escapes into the check portion molding space S23.

To improve a quality of products, it is preferable to set a constant amount of the melted resin injected into a cavity that is sufficient for a volume of the cavity. However, even if the amount of the melted resin injected from the gate is set to be constant, the amount of the melted resin that is necessary for sufficiently filling the cavity may change due to penetration of the melted resin into the base member. Therefore, it is difficult to set the amount of the melted resin injected to the cavity to be constant and this is a problem against improvement of product quality.

According to the present embodiment, even if the amount of the melted resin injected into the runner 263 changes, a margin of the amount of injected melted resin can be absorbed by the volume of the check portion molding space S23. This improves a quality of the door trim 210. The amount of melted resin injected into the runner 263 via the gate 262 is preferably set to be a total volume of the volumes of the runner 263, the mounting boss molding spaces S22, and the check portion molding space S23 or smaller than the total volume.

According to the present embodiment, the molding tool 250 includes a plurality of mounting boss molding spaces S22, for example two mounting boss molding spaces S22. In the molded member molding process, the melted resin is injected from the gate 262 and flows through the runner 263 formed in the molding tool 250 and accordingly the melted resin is injected into each of the mounting boss molding spaces S22. Thus, a plurality of mounting bosses 230 are molded. The check portion molding space S23 is provided to be communicated with the mounting boss molding space S22A that has a longest resin flow path from the gate 262.

Generally, as the resin flow path from the gate 262 to a cavity becomes longer, the melted resin is less likely to reach the cavity and the cavity is less likely to be sufficiently filled with the melted resin. In the present embodiment, the check portion molding space S23 is provided to one of a plurality of mounting boss molding spaces S22 (S22A) that has a longest resin flow path from the gate 262.

With this configuration, an operator checks if the check portion 235 is molded and confirms that the mounting boss molding space S22A having a longest resin flow path from the gate 262 is filled with the melted resin. The mounting boss molding space S22A is one of a plurality of cavities which the melted resin is most less likely to reach. Accordingly, it can be determined that all of a plurality of the mounting boss molding spaces S22 are filled with the melted resin. An operator can easily confirm that a plurality of mounting bosses 230 are surely molded by checking only one check portion 235, and this facilitates the check operation. This achieves a simple configuration of the molding tool 250 compared to a configuration that the check portion molding space S23 is provided for each of the mounting boss molding spaces S22.

Each of the mounting boss 230 and the check portion 235 is formed in substantially a plate shape. The thickness B5 of the check portion 235 is smaller than the thickness B1 of the mounting boss 230 (the main body 231).

Accordingly, the width C5 of the check portion molding space S23 for molding the check portion 235 is smaller than the width C1 of the main body molding space S221 for molding the main body 231. With this configuration, the melted resin is less likely to flow into the check portion molding space S23 compared to the main body molding space S221. Therefore, according to the confirmation that the melted resin reaches the check portion molding space S23 and the check portion 235 is molded, it can be confirmed more surely that the main body molding space S221 and the mounting boss molding space S22 are filled with the melted resin.

Fourth Embodiment

Figure 14:
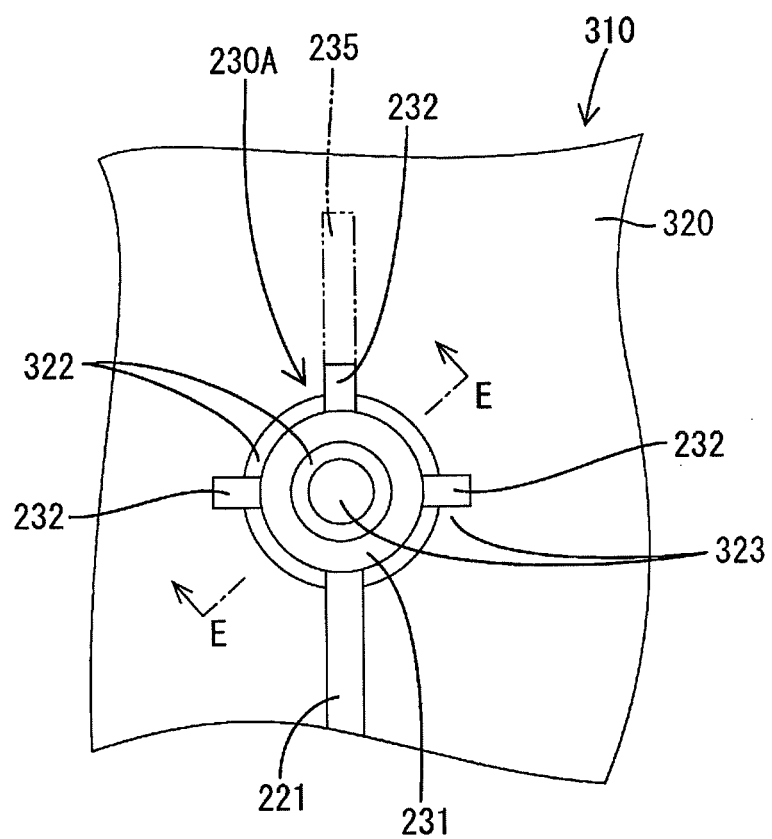
FIG. 14 is an enlarged plan view illustrating a part of a trim board near a mounting boss according to a fourth embodiment.

A fourth embodiment will be explained with reference to FIGS. 14 and 15. Components of the fourth embodiment same as those in the first to third embodiments are provided with the same numbers or symbols and will not be explained. As illustrated in FIG. 14, a door trim 310 of the fourth embodiment includes the mounting boss 230A that is formed on a rear surface of a trim board 320. The check portion 235 is integrally formed with the mounting boss 230A.

Similar to the trim board 20 of the first embodiment, a heated board is compressed with press molding by a molding tool 340 including an upper mold 341 and a lower mold 342. Thus, a trim board 320 of the fourth embodiment is molded. This process is the base member molding process.

Figure 15:
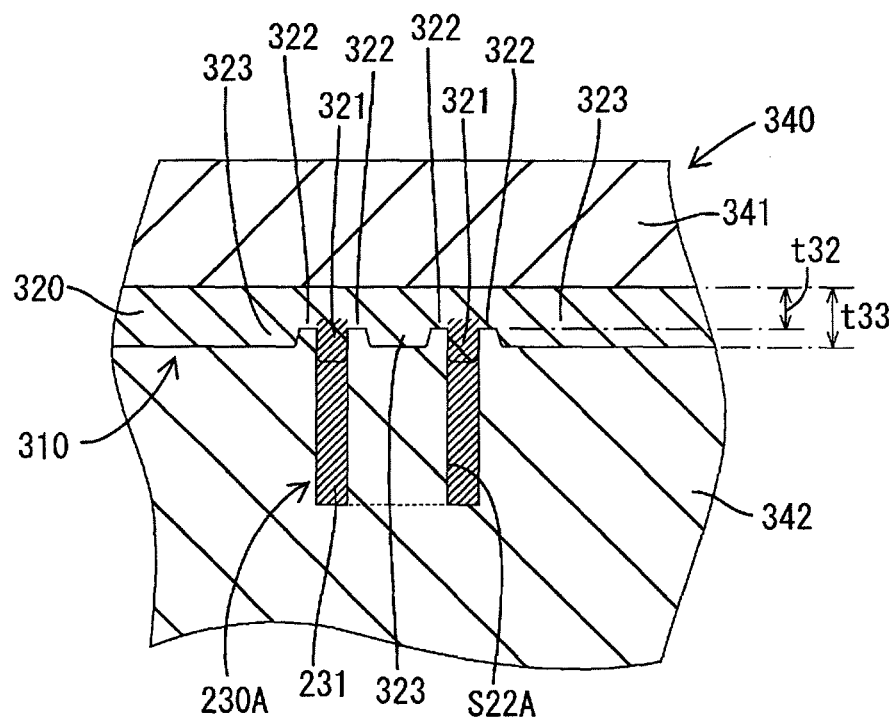
FIG. 15 is a cross sectional view illustrating the trim board and a mounting boss molded with the trim board in a closed state of a molding tool taken along an E-E line in FIG. 14.

In a state that the trim board 320 is pressed by the molding tool 340 as illustrated in FIG. 15, melted resin is injected into the mounting boss molding space S22A and the check portion molding space S23 (refer to FIG. 10) and the mounting boss 230A and the check portion 235 are molded. Thus, the mounting boss 230A and the check portion 235 are bonded and molded with the trim board 320 in the molded member molding process.

As illustrated in FIG. 15, the trim board 320 includes a connection portion 321 that is connected to the main body 231 (the molded member) and a first surrounding portion 322 that is a high density portion around the connection portion 321. The first surrounding portion 322 has a density higher than the connection portion 321. Further, a second surrounding portion 323 is formed around the first surrounding portion 322 and the first surrounding portion 322 has a density higher than the second surrounding portion 323.

The first surrounding portion 322 has a thickness t32 smaller than a thickness t33 of the second surrounding portion 323. The thickness of the trim board 32 decreases in a gradual manner from the second surrounding portion 323 to the first surrounding portion 322.

Before the board is molded into the trim board 320, the board has a same thickness and a constant density over its entire area. The board is compressed with press molding by the upper mold 341 and the lower mold 342 such that the first surrounding portion 322 has a thickness smaller than the second surrounding portion 323. Accordingly, the first surrounding portion 322 has a density higher than the second surrounding portion 323.

The contact portion 321 is a portion of the trim board 320 that is not compressed by the molding tool 340 or compressed with a smaller compression amount compared to other portions. Accordingly, the portion of the board corresponding to the bracket molding space S2 is projected compared to the surrounding portion and has a thickness greater than the surrounding portion. The projected portion is the connection portion 321 and a density of the connection portion 321 is lower than the first surrounding portion 322 and the second surrounding portion 323.

The mounting boss 230A has the main body 231 formed in a cylindrical shape, as illustrated in FIG. 14. Therefore, the connection portion 321 is formed in a circle following a shape of a bottom of the main body 231 in a plan view. In the fourth embodiment, the first surrounding portion 322 is formed in substantially a circle following the circular shape of the connection portion 321 in a plan view.

Specifically, as illustrated in FIG. 14, the first surrounding portion 322 is formed at an inner side and an outer side of the connection portion 321 in a plan view. The first surrounding portion 322 may be formed at any portions of the trim board 320 as long as it is formed around the connection portion 321 and the first surrounding portion 322 may be formed in a different portion according to the shape of the connection portion 321. The second surrounding portion 323 may be formed at any portions of the trim board 320 as long as it is formed around the first surrounding portion 322 and the second surrounding portion 323 may be formed in a different portion according to the first surrounding portion 322.

As is explained above, according to the fourth embodiment, the first surrounding portion 322 that is a high density portion is formed around the connection portion 321 of the trim board 320, and thereafter the mounting boss 230A is formed. Accordingly, the melted resin for molding the mounting boss 230A (the main body 231) is less likely to reach the connection portion 321.

Accordingly, the bonding area in which the trim board 320 and the main body 231 are bonded with each other is less likely to increase. As a result, a convex portion or a concave portion is less likely to be generated on a surface of the trim board 320 that is opposite to a surface on which the connection portion 321 is formed. The convex portion or the concave portion may be generated due to thermal contraction of the mounting boss 230.

In the fourth embodiment, the check portion 235 is integrally formed with the mounting boss 230A similar to the third embodiment. Therefore, an operator checks that the check portion 235 is molded and easily confirms that the mounting boss 230A is surely molded.

Other Embodiments

The present invention is not limited to the embodiments as described above with reference to the drawings. For example, the present invention may include following embodiments.

(1) In the first and second embodiments, the door trim 10 is an example of the molded structure body, and the trim board 20 is an example of the base member, and the bracket 30 is an example of the molded member. However, it is not limited thereto. The molded structure body may include a base member containing thermoplastic resin such as a back board of a seat and a molded member that is molded with the base member by injection of melted resin to the base member and bonded to the base member by melting the base member and the molded member.

(2) The trim board 20 may include a plurality of brackets 30.

(3) In the first and second embodiments, the convex portion 50, 150 is formed to have substantially trapezoidal cross sectional shape. However, it is not limited thereto. The convex portion 50 is formed in any shape as long as the board P1 is partially compressed with a great pressure to form the first surrounding portion 22.

(4) The first surrounding portion 22 is not necessarily provided to surround an entire periphery of the connection portion 21. The second surrounding portion 23 is not necessarily provided to surround an entire periphery of the first surrounding portion 22.

(5) In the first and second embodiments, the board P1 has a thickness and a density each of which is constant over its entire area. However, it is not limited thereto. The board P1 may have different thicknesses or densities in different portions as long as the board P1 is compressed with press molding to be molded to the trim board 20 that includes the first surrounding portion 22 having a density higher than the second surrounding portion 23. The first surrounding portion 22 and the second surrounding portion 23 may have substantially a same thickness.

(6) In the first and second embodiments, the thickness or the density of the trim board 20 decreases in a gradual manner as is closer to the first surrounding portion 22 from the second surrounding portion 23. However, it is not limited thereto. The thickness or the density of the first surrounding portion 22 may be extremely smaller or lower than that of the surrounding portion (the second surrounding portion 23) around the first surrounding portion 22.

(7) The materials of the trim board 20 and the bracket 30 are not limited to the examples described in the first and second embodiments but may be altered if necessary.

(8) In the third embodiment, the door trim 210 is an example of the molded structure body, and the trim board 220 is an example of the base member. However, it is not limited thereto. The molded structure body may be any component as long as melted resin is injected to a base member containing thermoplastic resin to mold a molded member and connect the base member and the molded member. Examples of the molded structure body may include an ornament base member, a back board of a seat, and a shield member that covers a utility part of a seat. Any other parts other than the mounting bosses 230 may be provided to the door trim 210.

(9) In the third embodiment, an example of the molded member is the mounting boss 230. However, it is not limited thereto. A bracket that is attached to a door inner panel may be an example of the molded member.

(10) The number of the mounting bosses 230 is not limited to the one described in the third embodiment but may be altered if necessary. For example, only one mounting boss 230 may be formed on the trim board 220.

(11) The check portion 235 may not be necessarily formed in the portion described in the third embodiment. For example, the check portion 235 may be formed to extend from the main body 231 of the mounting boss 230.

(12) The check portion 235 is required to be integrally formed with at least the mounting boss 230 (the molded member) and may not be necessarily connected to or bonded with the trim board 220.

(13) In the third embodiment, the runner 263 is branched into two. However, the shape of the runner 26 is not limited thereto. In the third embodiment, the runner 263 is formed on a surface of the lower mold 261 of the molding tool 250. However, it is not limited thereto. The runner 263 may be formed inside the molding tool 250. In this molding tool 250, the rib 221 following the runner is not formed on the trim board 220.

(14) Each of a plurality of molded members molded on the base member may be formed in a different shape. For example, each of the two mounting bosses 230 may be formed in a different shape.

(15) In the third embodiment, the trim board 220 is arranged on the molding tool 250 at the same time as the trim board 220 is molded with press molding. However, it is not limited thereto. For example, the trim board 220 may be molded with press molding and then, the molded trim board 220 may be arranged on the molding tool 250. Thereafter, the mounting boss 230 may be molded with injection molding.

(16) The material of the trim board 220 and the mounting boss 230 is not limited to the ones described in the above embodiments but may be altered if necessary.

(17) In the above embodiments, the upper mold is a movable mold and the lower mold is stationary mold. However, it is not limited thereto.

The invention claimed is:

1. A molded structure body comprising:
a base member including at least thermoplastic resin and the base member including:
a connection portion;
a first surrounding portion provided close to the connection portion and having a first density; and
a second surrounding portion provided close to the first surrounding portion and having a second density, wherein the first density is higher than the second density,
a groove portion around the connection portion and on a surface of the base member on which the connection portion is formed, the groove portion having a density higher than the first density and a thickness less than any one of the connection portion, the first surrounding portion, and the second surrounding portion; and
the molded structure body further comprising:
a molded member connected to and molded with the base member by injection of melted resin to the base member, the molded member being connected to the connection portion.

2. The molded structure body according to claim 1, wherein the base member has a density that increases in a gradual manner from the second density of the second surrounding portion to the first density of the first surrounding portion.

3. The molded structure body according to claim 1, wherein the connection portion is formed to be projected from a surface of the base member and has a third density that is lower than the first density of the first surrounding portion.

4. The molded structure body according to claim 3, wherein the third density is lower than the second density of the second surrounding portion.

5. The molded structure body according to claim 1, wherein the first surrounding portion has a thickness smaller than the second surrounding portion.

6. The molded structure body according to claim 1, wherein:
the first surrounding portion is provided around the connection portion; and
the second surrounding portion is provided around the first surrounding portion.

7. The molded structure body according to claim 1, wherein the melted resin configuring the molded member penetrates the connection portion, thereby bonding the molded member and the connection portion.

8. The molded structure body according to claim 1, wherein:
the molded member has a close end portion that is closest to a gate from which the melted resin is injected and a far end portion that is farthest from the gate, and the molded structure body further comprising:
a check portion provided to the far end portion of the molded member that is molded by injection of the melted resin from the gate.

9. The molded structure body according to claim 8, wherein the check portion has a width dimension smaller than the molded member.

10. The molded structure body according to claim 1, wherein the first surrounding portion is around the groove portion.

11. The molded structure body according to claim 6, wherein the first surrounding portion is continuous from the connection portion and the second surrounding portion is continuous from the first surrounding portion.

12. A molded structure body comprising:
a base member including at least thermoplastic resin and the base member including:
a connection portion;
a first surrounding portion provided close to the connection portion and having a first density; and
a second surrounding portion provided close to the first surrounding portion and having a second density, wherein the first density is higher than the second density, and
the molded structure body further comprising:
a molded member connected to and molded with the base member by injection of melted resin to the base member, the molded member being connected to the connection portion,
wherein the connection portion is formed to be projected from a surface of the base member and has a third density that is lower than the first density of the first surrounding portion, and
wherein the third density is lower than the second density of the second surrounding portion.

13. The molded structure body according to claim 12, wherein:
the first surrounding portion is provided around the connection portion; and
the second surrounding portion is provided around the first surrounding portion.

14. The molded structure body according to claim 13, wherein the first surrounding portion is continuous from the connection portion and the second surrounding portion is continuous from the first surrounding portion.

* * * * *